(12) United States Patent
Pete et al.

(10) Patent No.: US 7,690,505 B2
(45) Date of Patent: Apr. 6, 2010

(54) WHEEL HUB SHIPPING RETAINER SYSTEM

(75) Inventors: Reginal A. Pete, Rockford, IL (US); Gary Tope, Byron, IL (US); Adam Purvis, Rockford, IL (US)

(73) Assignee: Gunite Corporation, Rockford, IL (US)

( * ) Notice: Subject to any disclaimer, the term of this patent is extended or adjusted under 35 U.S.C. 154(b) by 923 days.

(21) Appl. No.: 11/420,955

(22) Filed: May 30, 2006

(65) Prior Publication Data

US 2007/0278118 A1 Dec. 6, 2007

(51) Int. Cl.
*B65D 85/58* (2006.01)
(52) U.S. Cl. .................. 206/318; 206/303; 206/493; 206/564; 301/105.1; 301/106
(58) Field of Classification Search .......... 206/318, 206/303, 493, 592, 415, 416, 446, 564; 301/105.1, 301/106
See application file for complete search history.

(56) References Cited

U.S. PATENT DOCUMENTS

| 3,080,964 | A |   | 3/1963 | Robinson et al. |  |
|---|---|---|---|---|---|
| 3,221,874 | A |   | 12/1965 | Pitner |  |
| 3,955,673 | A |   | 5/1976 | Fosness |  |
| 4,883,178 | A | * | 11/1989 | Thiele et al. ............... | 206/391 |
| 5,048,571 | A | * | 9/1991 | Ellis .......................... | 138/96 R |
| 5,622,260 | A | * | 4/1997 | Chamberlin et al. ........ | 206/394 |
| 6,112,894 | A | * | 9/2000 | Kikuchi et al. ............ | 206/308.1 |
| 6,484,877 | B1 | * | 11/2002 | Murakami et al. .......... | 206/303 |

FOREIGN PATENT DOCUMENTS

FR 1 477 297 A 4/1967
FR 2 348 866 A 11/1977

OTHER PUBLICATIONS

European Search Report, European Patent Application No. 07251997.5, dated Sep. 21, 2007.

* cited by examiner

*Primary Examiner*—David T Fidei
(74) *Attorney, Agent, or Firm*—Michael Best & Friedrich LLP

(57) ABSTRACT

A packaging system for protecting a wheel hub containing inboard and outboard bearings separated by a spacer. The packaging system comprises a shipping retainer having inboard and outboard elements that are reversibly locked together within the axial bore of the wheel hub to seal the ends of the axial bore and maintain the alignment of the bearings and spacer. The packaging system further includes a stackable shipping tray having first and second sides, the first side adapted to receive the inboard end of a wheel hub with the shipping retainer installed and the second side adapted to receive the outboard end of a wheel hub. The shipping tray cooperates with the shipping retainer to facilitate assembly and disassembly of the shipping retainer.

29 Claims, 22 Drawing Sheets

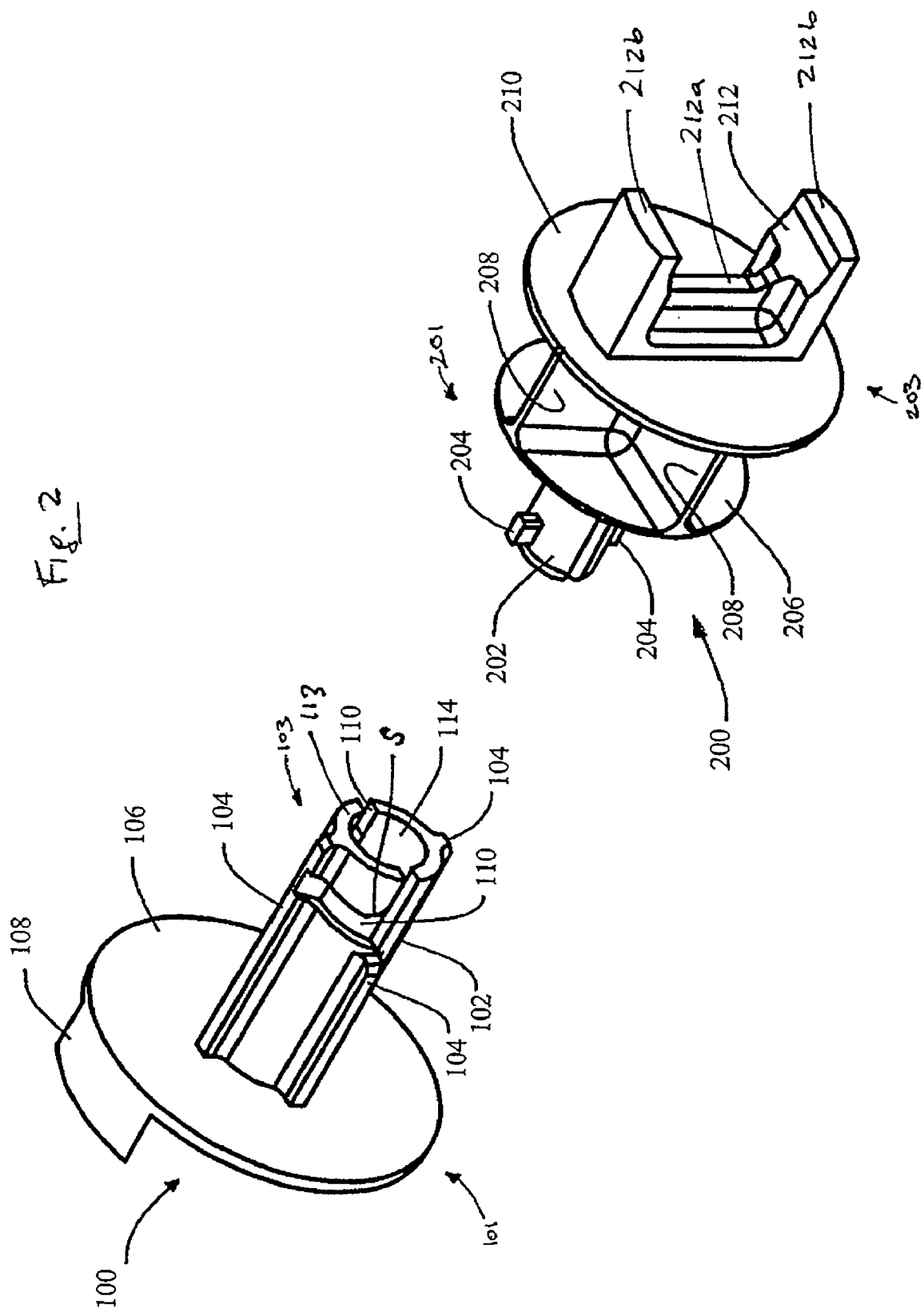

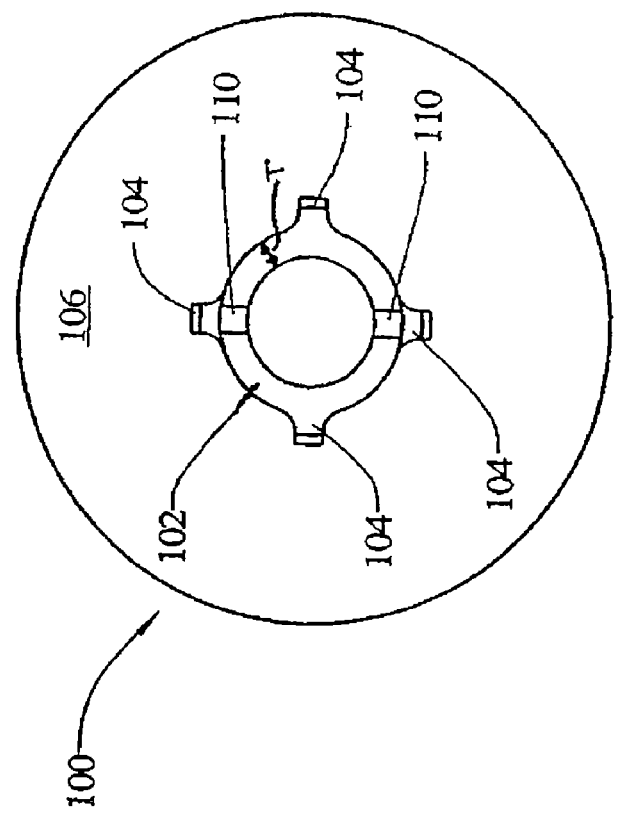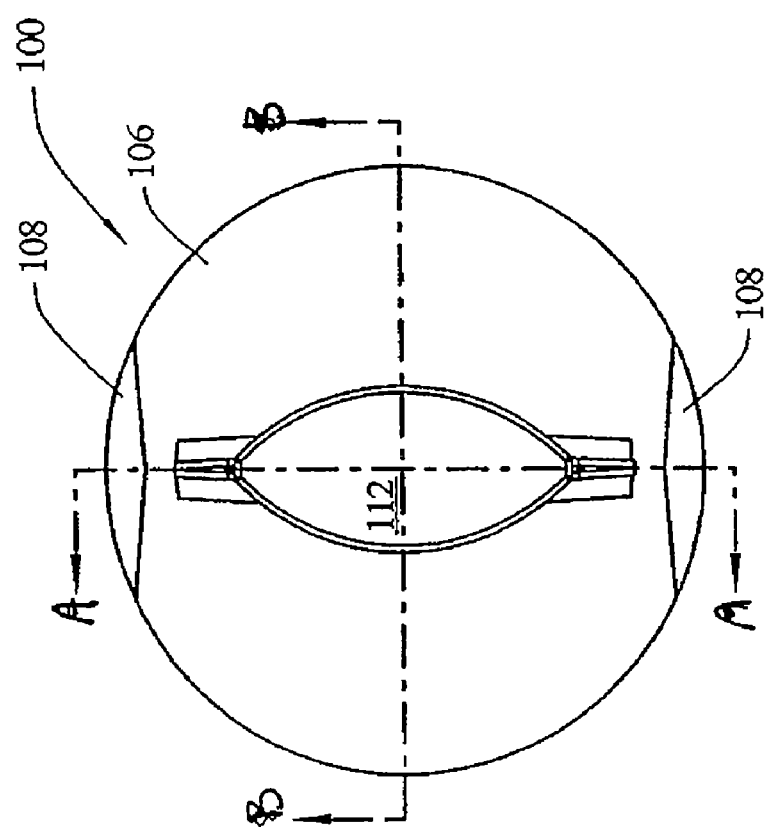

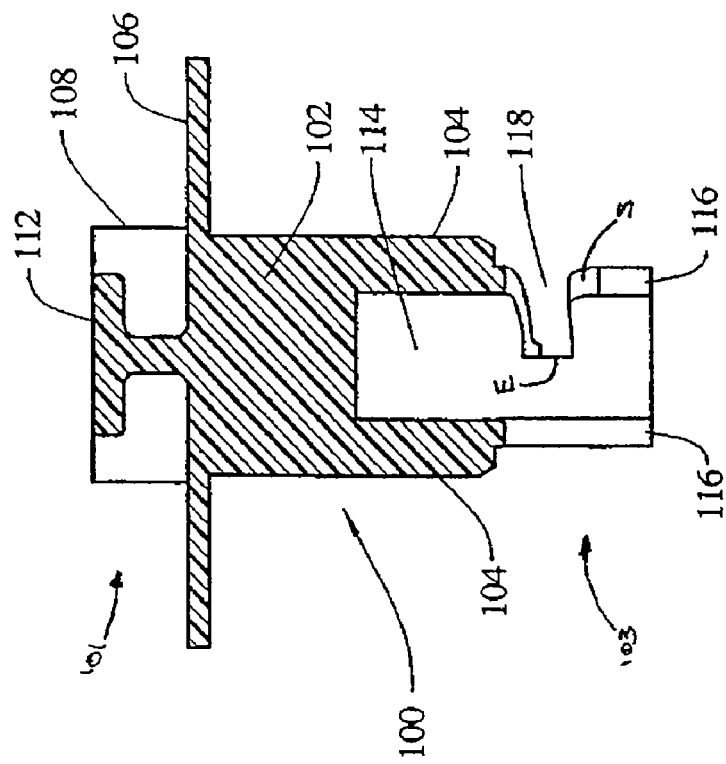
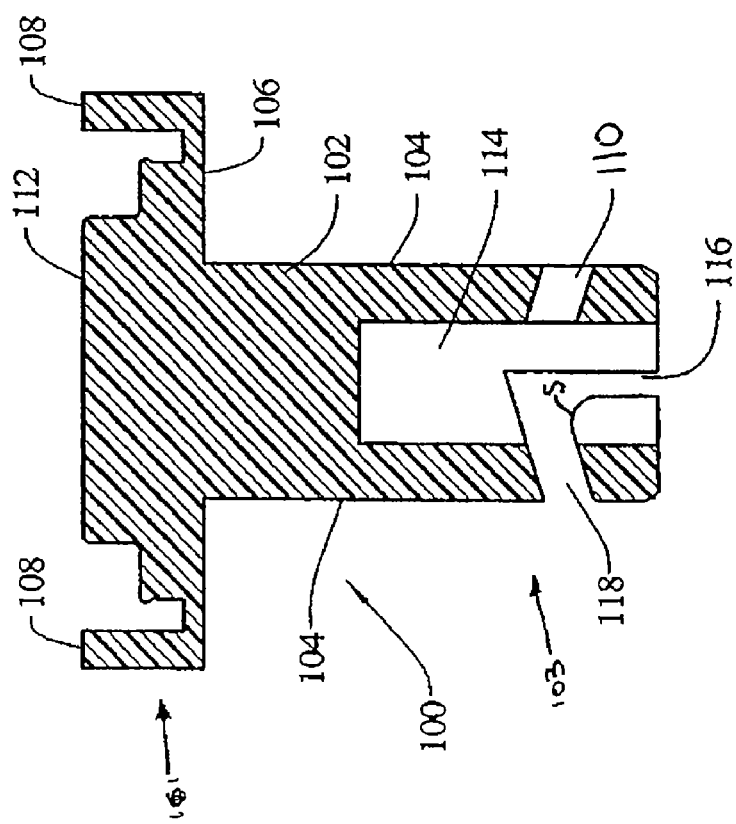

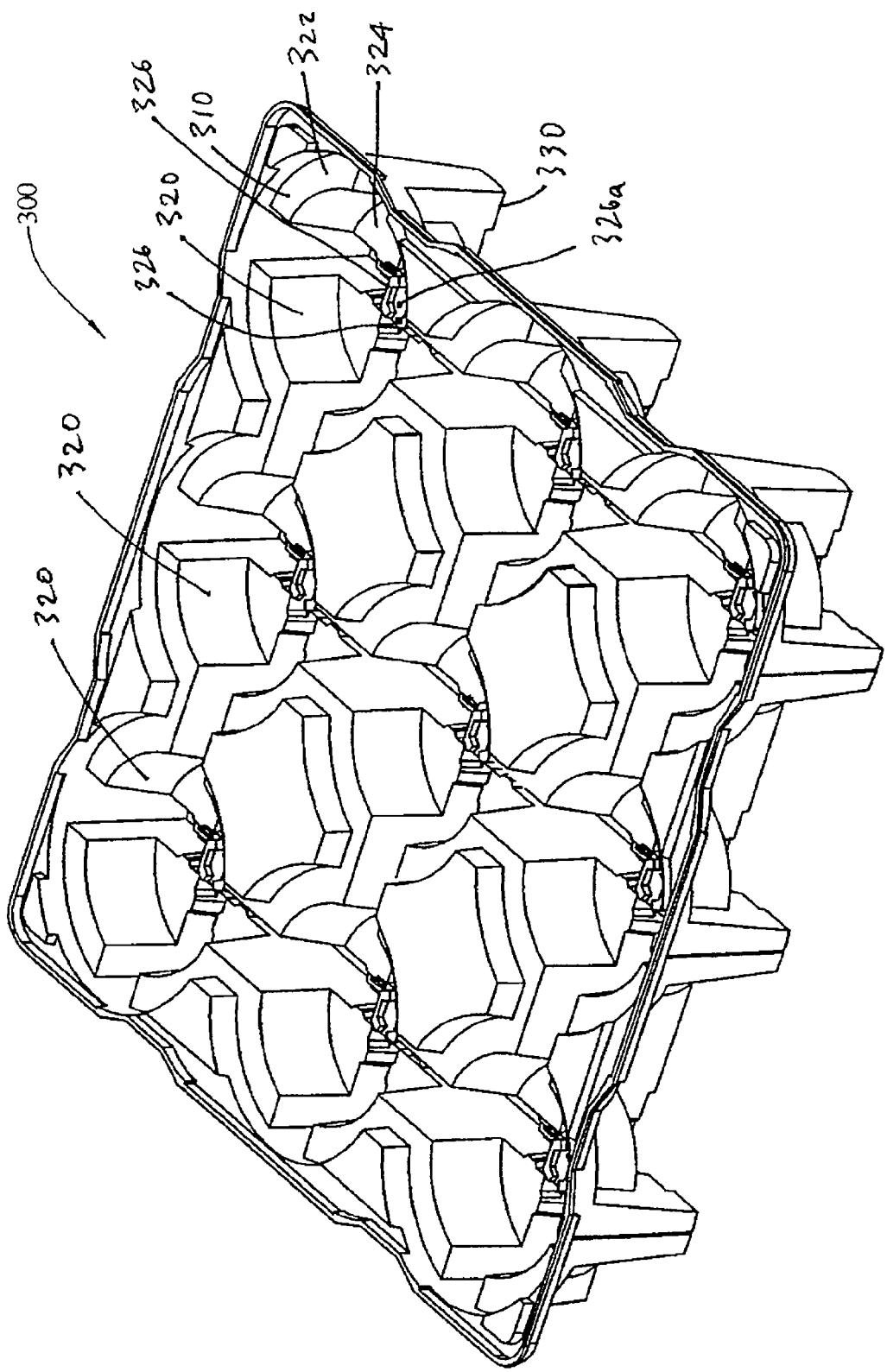

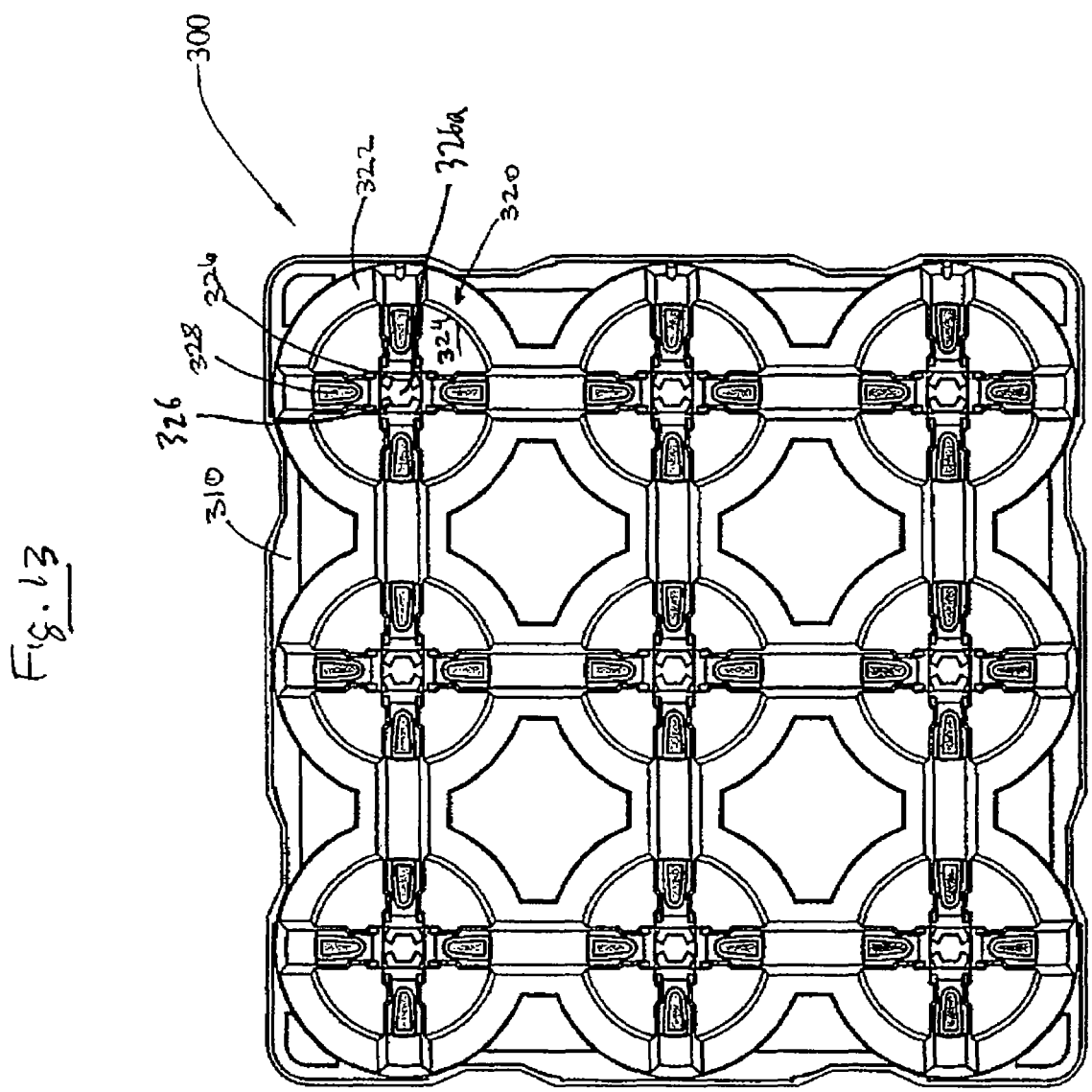

WHEEL HUB SHIPPING RETAINER SYSTEM

FIELD OF THE INVENTION

This invention pertains generally to packaging systems. More particularly, this invention pertains to a packaging system for protecting commercial vehicle wheel hubs during shipment.

BACKGROUND OF THE INVENTION

Wheel hubs, such as those used for commercial vehicles, are heavy, awkwardly shaped items that can be difficult to handle. Wheel hubs typically comprise a cylindrical main body with an axial bore for receiving the vehicle axle. The axle is supported on ring-shaped roller bearings (e.g., bearing cones) that are positioned at the inboard and outboard ends of the axial bore and, may be or may not be, separated by a cylindrical spacer. The bearings and spacer must be aligned before the wheel hub can be properly installed on the axle.

A radial flange extends from the main body and is provided with a series of bolts for mounting the wheel and brake drum (or brake disc) on the wheel hub. The radial flange is further provided with pilot surfaces for guiding the proper installation of the brake drum and/or disc wheel on the wheel hub. Dents, scrapes and other damage to the pilot surfaces can cause misalignment between the wheel hub, disc wheel and brake drum, resulting in vibration, shimmy, premature wear and/or failure of the disc wheel, the tire and/or the brake drum.

Because of their size, shape and weight, wheel hubs are prone to mishandling during shipping and installation, which may result in loss of the bearings and/or misalignment of the bearings relative to the spacer. Dirt or debris may also be introduced into the axial bore, which may contaminate the bearing lubricant and consequently cause premature failure of the hub. In addition, the wheel hub is usually formed of relatively soft materials, such as cast ductile iron, aluminum, magnesium composites and other materials. As a result, the pilot surfaces are susceptible to damage caused by mishandling during shipping.

Thus, there is a need for a wheel hub packaging system that ensures the proper alignment of the bearings and spacer, and facilitates installation of a wheel hub onto an axle. In addition, there is a need for a packaging system that protects the wheel hub from damage and the introduction of dirt and debris.

SUMMARY OF THE INVENTION

In accordance with the present invention, a packaging system for a wheel hub is described. The wheel hub has an inboard end, an outboard end and an axial bore. The axial bore contains an inboard bearing positioned at the inboard end of the wheel hub, an outboard bearing positioned at the outboard end of the wheel hub, and when required a spacer is positioned between the inboard and outboard bearings. The inboard and outboard bearings and the spacer each have an opening for receiving an axle.

The packaging system comprises an inboard element with a first body and a first radial flange. The first radial flange is sized and shaped to fit within the axial bore at the inboard end of the wheel hub. The outboard element has a second body and a second radial flange. The second radial flange is sized and shaped to fit within the axial bore at the outboard end of the wheel hub. A locking member is provided on one of the inboard and outboard elements, and a receiving member is provided on the other of the inboard and outboard elements. The locking member is engageable with the receiving member to lock the inboard and outboard elements together within the axial bore. In an alternative embodiment, the inboard element has a first body that is sized and shaped to fit within and align the openings of the inboard bearing and the spacer. The outboard element has a second body that is sized and shaped to fit within and align the openings of the outboard bearing and the spacer. In yet another embodiment, the locking member is rotationally engageable with the receiving member and a projection extends from the first radial flange.

The packaging system further comprises a tray sized and shaped to receive the inboard end of the wheel hub. A recess is provided in the tray that is sized and shaped to receive the projection and prevent the rotation of the inboard element relative to the tray and to facilitate locking and unlocking of the inboard and outboard elements.

BRIEF DESCRIPTION OF THE DRAWINGS

FIG. 2 illustrates an exploded perspective view of the disassembled shipping retainer of FIG. 1.

FIG. 3 illustrates an outboard end view of the shipping retainer outboard element of FIG. 1.

FIG. 4 illustrates an inboard end view of the shipping retainer outboard element of FIG. 1.

FIG. 5 illustrates a side section view of the shipping retainer outboard element of FIG. 3, taken along line A-A.

FIG. 6 illustrates a side section view of the shipping retainer outboard element of FIG. 3, taken along line B-B.

FIG. 12 illustrates a perspective view of a shipping tray, in accordance with the packaging system of the present invention.

FIG. 13 illustrates a top plan view of the shipping tray of FIG. 12.

DETAILED DESCRIPTION OF THE EMBODIMENTS

Figure 1:
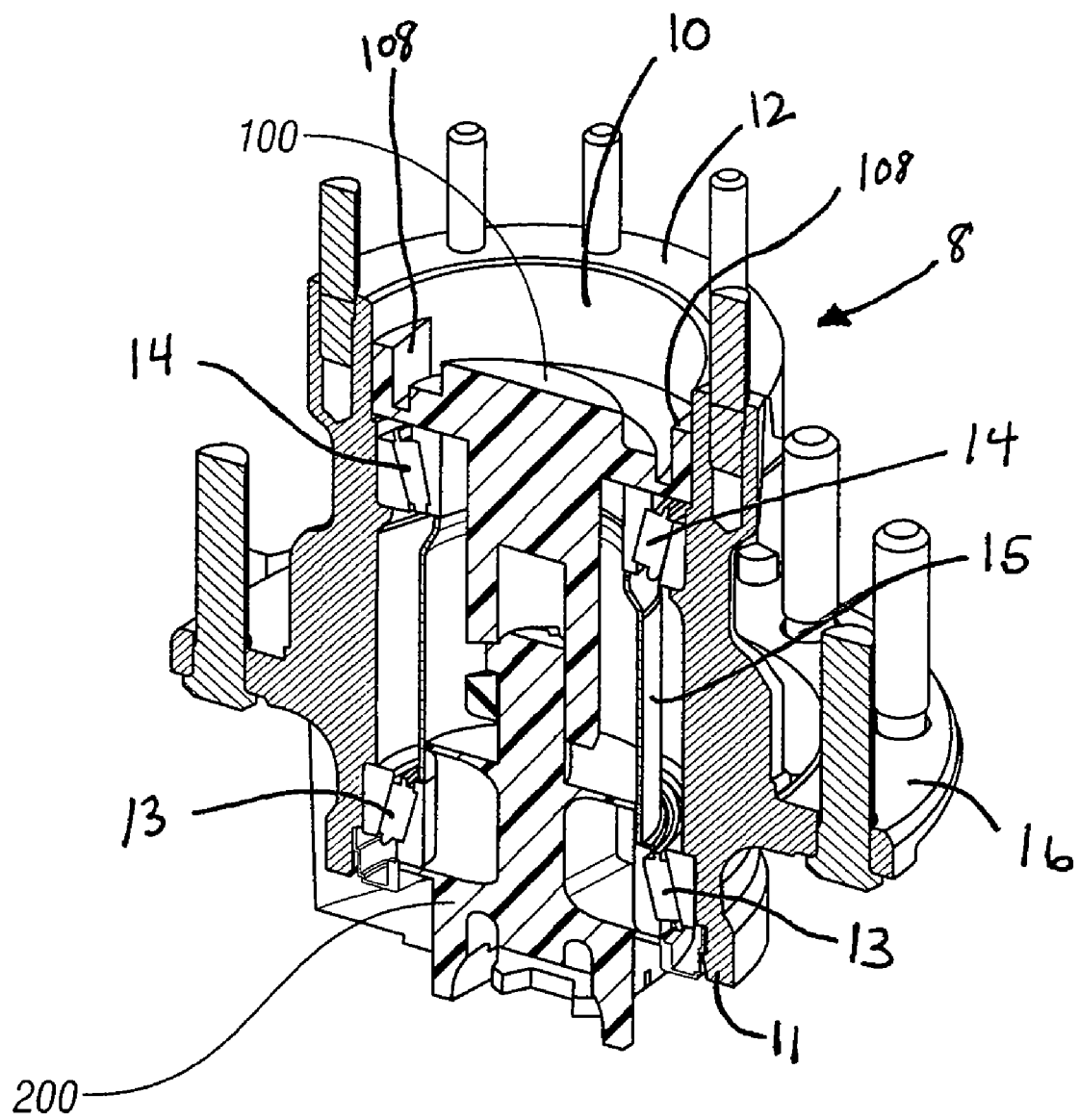
FIG. 1 illustrates a cross-sectional view of a shipping retainer assembled within the axial bore of a conventional wheel hub, in accordance with the packaging system of the present invention.
Figure 8:
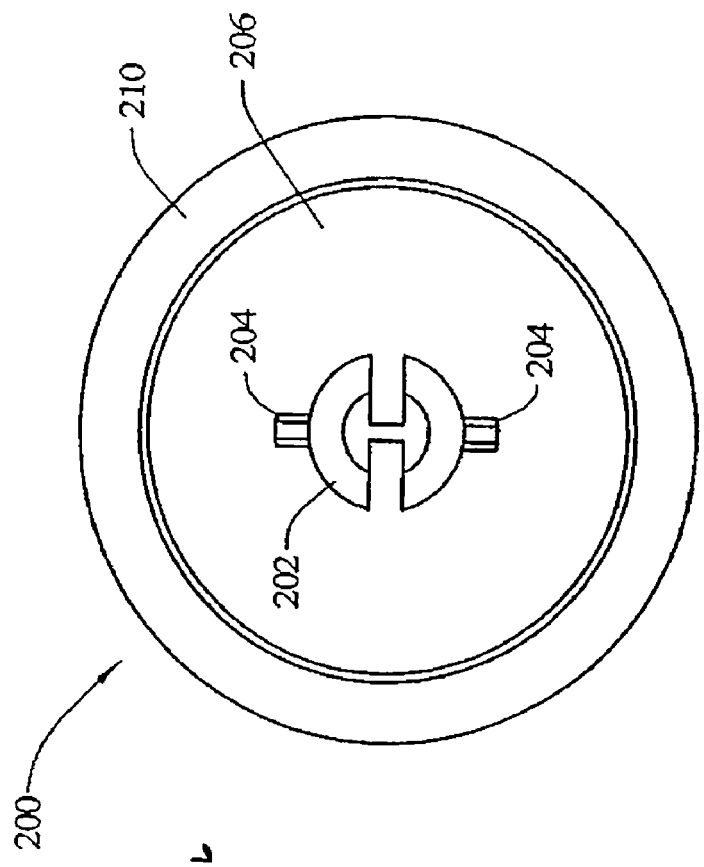
FIG. 8 illustrates an outboard end view of the shipping retainer inboard element of FIG. 1.
Figure 7:
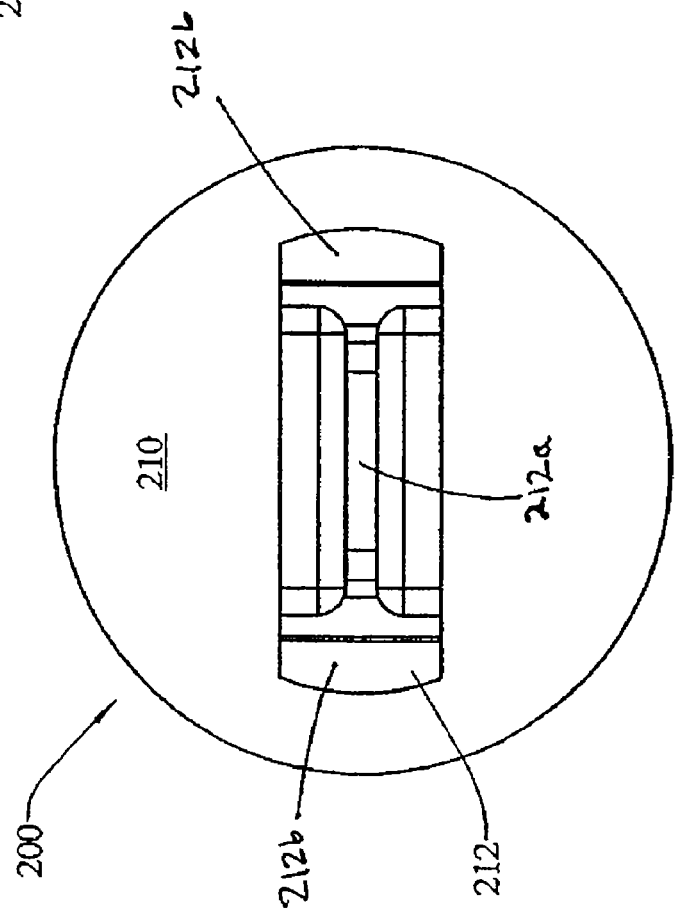
FIG. 7 illustrates an inboard end view of the shipping retainer inboard element of FIG. 1.
Figure 14:
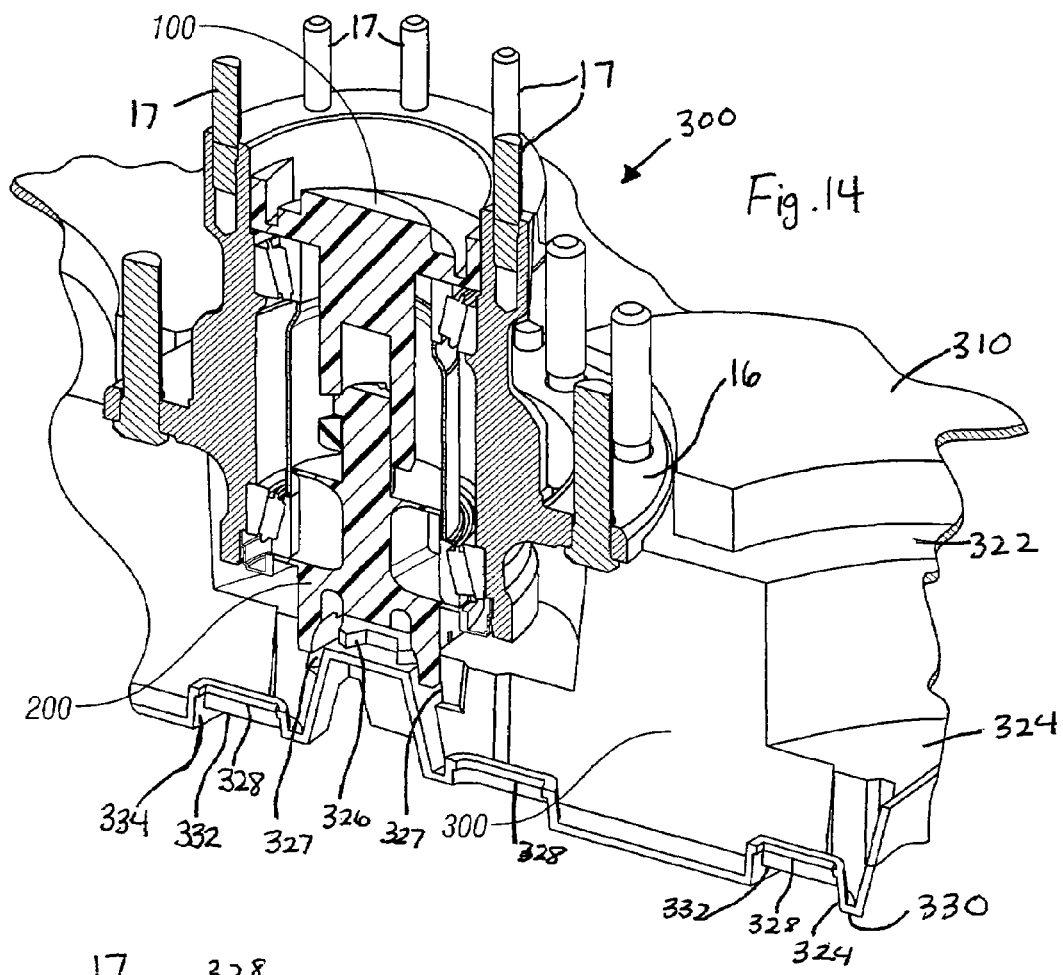
FIG. 14 is a side section view showing the inboard end of the shipping retainer and wheel hub of FIG. 1 seated in a shipping tray, in accordance with the present invention.
Figure 15:
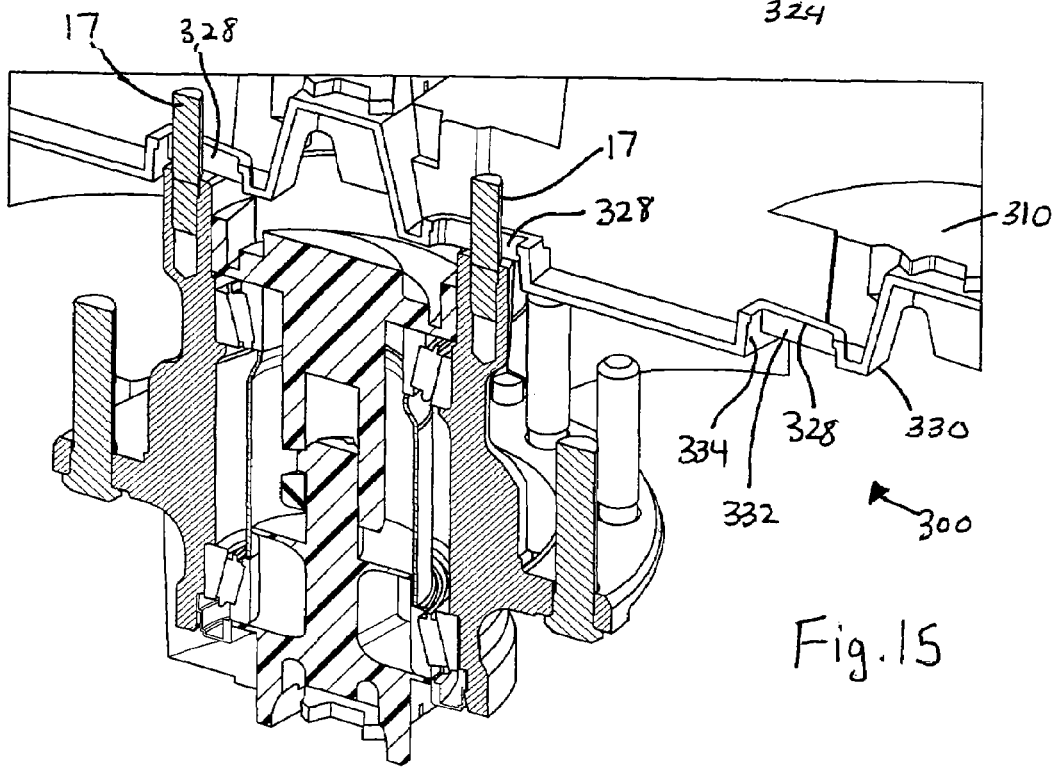
FIG. 15 is a side section view showing a shipping tray seated on the outboard end of the shipping retainer and wheel hub of FIG. 1, in accordance with the present invention.

Referring now to the drawings, and particularly FIG. 1, the wheel hub packaging system comprises a wheel hub shipping retainer, which is positioned within the axial bore of a wheel hub, and a shipping tray, which is sized and shaped to receive the wheel hub and to engage the shipping retainer. As best shown in FIGS. 1, 14 and 15, the packaging system in accordance with the illustrated embodiment is for a conventional wheel hub of the type used in commercial vehicles, such as a truck, truck tractor and tractor-trailer. The wheel hub 8 has an axial bore 10 with inboard and outboard ends 11, 12 for receiving the vehicle axle. As used herein, the term "inboard" means proximal to or oriented toward the vehicle, whereas the term "outboard" means distal to or oriented away from the vehicle. The wheel hub 8 is supported on the vehicle axle (not shown) by ring-shaped inboard and outboard roller bearings 13, 14 that are disposed within axial bore 10. Inboard and outboard bearings 13, 14 may be separated by a cylindrical spacer 15.

During shipping, bearings 13, 14 and spacer 15 are held within axial bore 10 by a shipping retainer that comprises an outboard element 100 and an inboard element 200, as shown in FIG. 2. Outboard element 100 includes a main body 102 with an outboard end 101 and an inboard end 103. The main body 102 is generally cylindrical, having a wall 113 defining a central opening 114. The exterior of the main body 102 includes a plurality of axial ribs 104 that are arcuately spaced apart. As shown, the main body 102 includes four axial ribs 104 that are equally spaced apart by ninety degrees, but a different number of ribs having different spacing may be used. Axial ribs 104 are sized and shaped to fit within the inner circumference of outboard bearing 14 and the adjacent inner circumference of spacer 15. Outboard end 101 includes a circular radial flange 106 that is sized and shaped to fit within outboard end 12 of axial bore 10, but has a greater width than the diameter of the inner circumference of outboard bearing 14. Thus, when the outboard element 100 is inserted into outboard end 12 of axial bore 10, radial flange 106 rests on outboard bearing 14 and seals the outboard bearing within the axial bore and prevents the introduction of dust, dirt, or other contaminant into the bore.

As shown in FIGS. 2, 5 and 6, a pair of generally L-shaped slots 110 are formed in wall 113 of main body 102. Each L-shaped slot 110 has an axial portion 116 and a spiral portion 118, with the transition between the axial and spiral portions 116, 118 forming a shoulder S in the main body 102. The two slots 110 are spaced about 180° from each other such that their respective spiral portions 118 are diametrically opposed. As further described hereafter, slots 110 and opening 114 cooperate with the inboard element 200 to permit elements 100, 200 to lock and unlock (reversibly lock) together within axial bore 10, so that the shipping retainer holds and aligns bearings 13, 14 and spacer 15 relative to each other within the bore.

Figure 9:
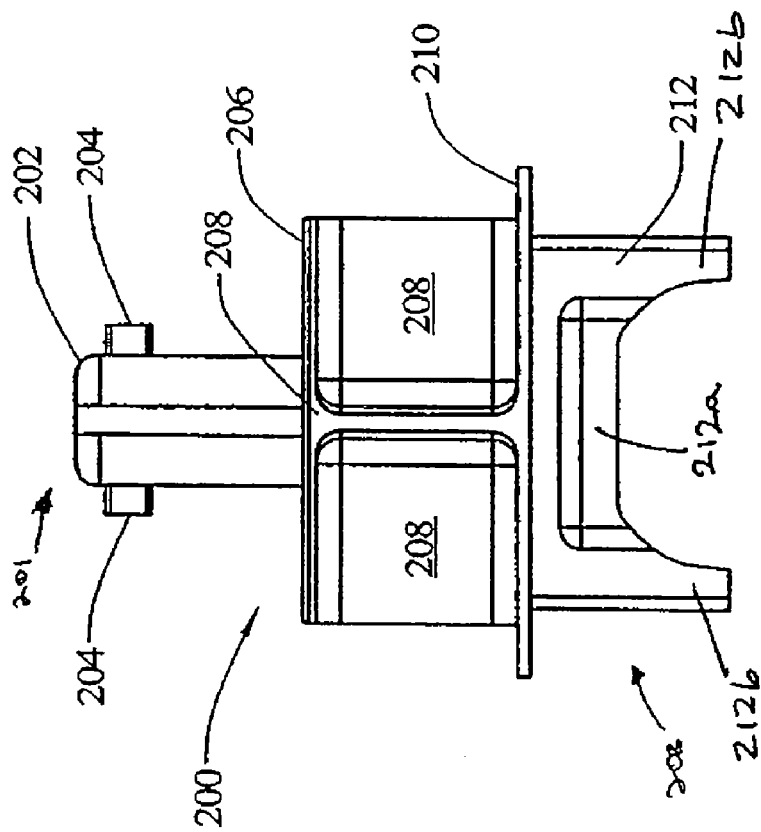
FIG. 9 illustrates a side elevation view of the shipping retainer inboard element of FIG. 1.
Figure 10:
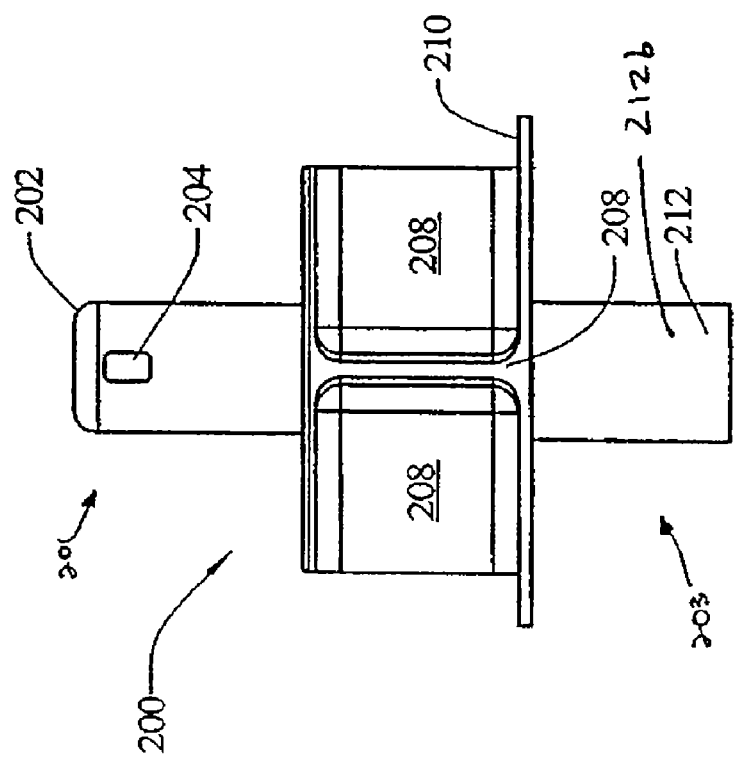
FIG. 10 illustrates a side elevation view of the shipping retainer inboard element of FIG. 9, rotated 90 degrees.

As shown in FIGS. 2, 9 and 10, the inboard element 200 has an outboard end 201 and an inboard end 203. Outboard end 201 includes a generally cylindrical post 202 with nubs 204, and inboard end 203 includes an inboard radial flange 210. Nubs 204 are diametrically opposed and are sized and shaped to travel within slots 110 of outboard element 100 without accidentally disengaging therefrom. The inboard end of post 202 is connected to an intermediate radial flange 206. Intermediate radial flange 206 is connected by a plurality of axial webs 208 to inboard radial flange 210.

As best shown in FIG. 1, intermediate radial flange 206 and axial webs 208 are sized and shaped to fit within the inner circumference of inboard bearing 13 and the adjacent inner circumference of spacer 15. Similar in function to radial flange 106 of outboard element 100, inboard radial flange 210 of inboard element 200 is sized and shaped to fit within inboard end 11 of axial bore 10, but has a greater width than the diameter of the inner circumference of inboard bearing 13. Thus, when inboard element 200 is inserted into inboard end 11 of axial bore 10, inboard radial flange 210 rests against inboard bearing 13 and is operative to seal inboard bearing 13 within axial bore 10 and prevent the introduction of dust, dirt, or other contaminant into the bore. More particularly, when the shipping retainer is assembled, the shipping retainer seals axial bore 10 and aligns inboard and outboard bearings 13, 14 relative to spacer 15.

The shipping retainer is assembled on a wheel hub by locking together outboard and inboard elements 100, 200 within axial bore 10. Inboard element 200 is inserted into inboard end 1 of axial bore 10, such that post 202 projects into axial bore 10 and inboard radial flange 210 rests against inboard bearing 13. Intermediate radial flange 206 and axial webs 208 contact the inner circumference of spacer 15 and inboard bearing 13 to maintain their relative alignment within axial bore 10. Similarly, outboard element 100 is inserted into outboard end 12 of axial bore 10, such that main body 102 projects into axial bore 10 and outboard radial flange 106 rests on outboard bearing 14. When outboard and inboard elements 100, 200 are locked together within axial bore 10, as described in further detail hereafter, the shipping retainer is securely affixed to the hub to seal axial bore 10 and support and maintain the relative alignment of bearings 13, 14 and spacer 15. Because the widths of radial flanges 106, 210 are greater than the diameters of their proximate bearings' inner circumferences, the shipping retainer cannot be removed from axial bore 10 as long as inboard and outboard elements 100, 200 remain locked together.

Referring now to FIGS. 3, 5 and 6, radial flange 106 of outboard element 100 includes an integral handle 112. Handle 112 is preferably shaped to fit within an individual's palm to facilitate manipulation of the outboard element 100, particularly to facilitate manual rotation of outboard element 100 within axial bore 10 for locking outboard and inboard elements 100, 200 together, as described in detail below. Although handle 112 is shown having a generally oval or elliptical shaped top, handle 112 may be shaped otherwise, such as with an ergonomic treatment. As best shown in FIG. 6, handle 112 has a T-shaped cross section. As shown, the top of handle 112 is spaced apart from the outboard radial flange 106 so that an individual may curl his or her fingers around and under the handle top when the handle 112 is gripped in the individual's palm. In this way, the individual may easily apply a force to outboard element 100 to engage and lock elements 100, 200 together.

Radial flange 106 also includes wings 108, which increase the surface area of radial flange 106 in contact with the inner circumference of axial bore 10, to stabilize and maintain the alignment of outboard element 100 within axial bore 10, as best shown in FIG. 1. More particularly, wings 108 preclude the inboard element 100 from falling out of the bore when elements 100, 200 are uncoupled and the hub is oriented for installation onto an axle such that the axial bore 10 is generally parallel to the ground.

Figure 11A:
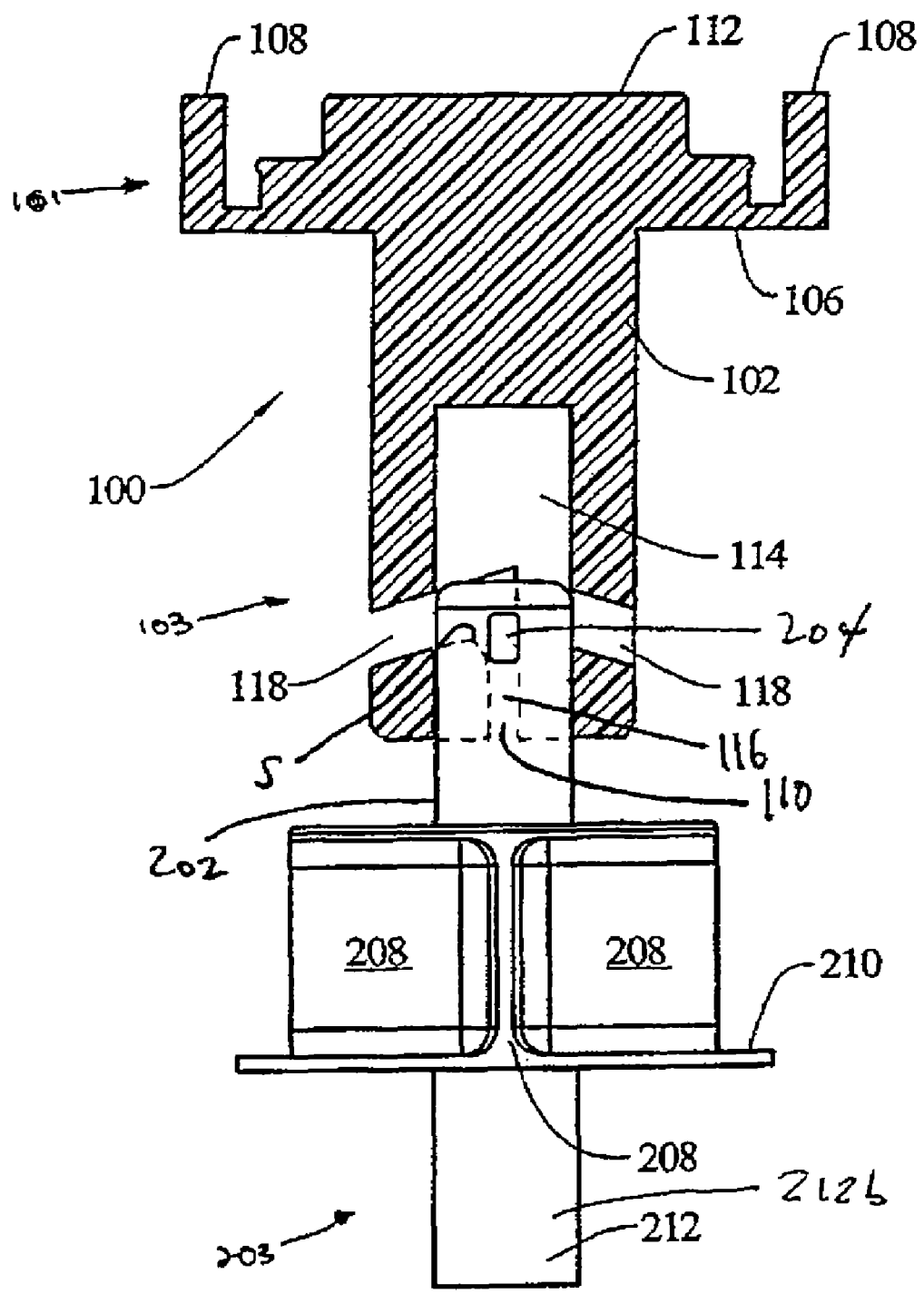
FIGS. 11a,b,c illustrate the locking engagement of the shipping retainer inboard and outboard elements shown in FIG. 1.
Figure 116:
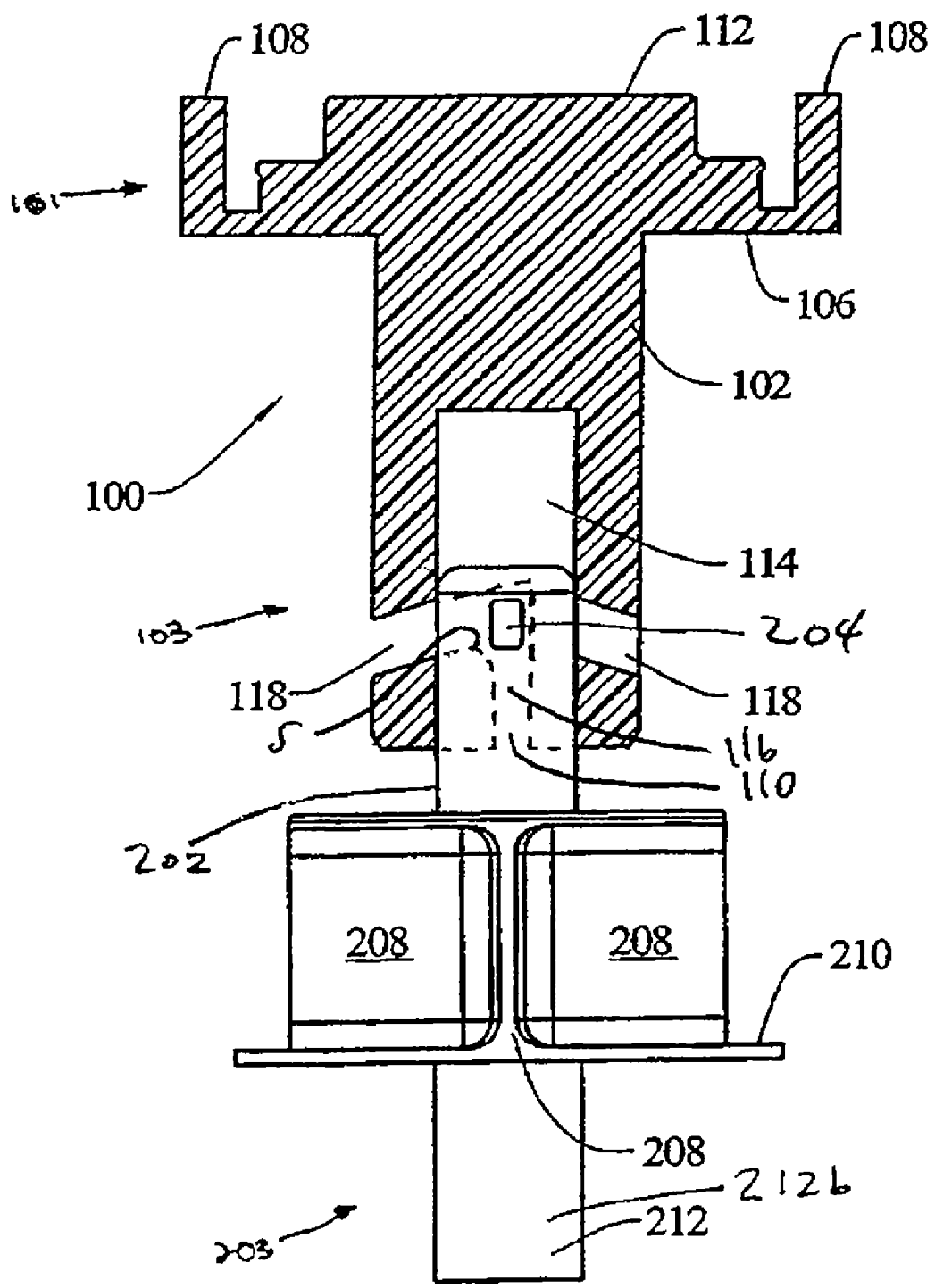
Figure 11C:
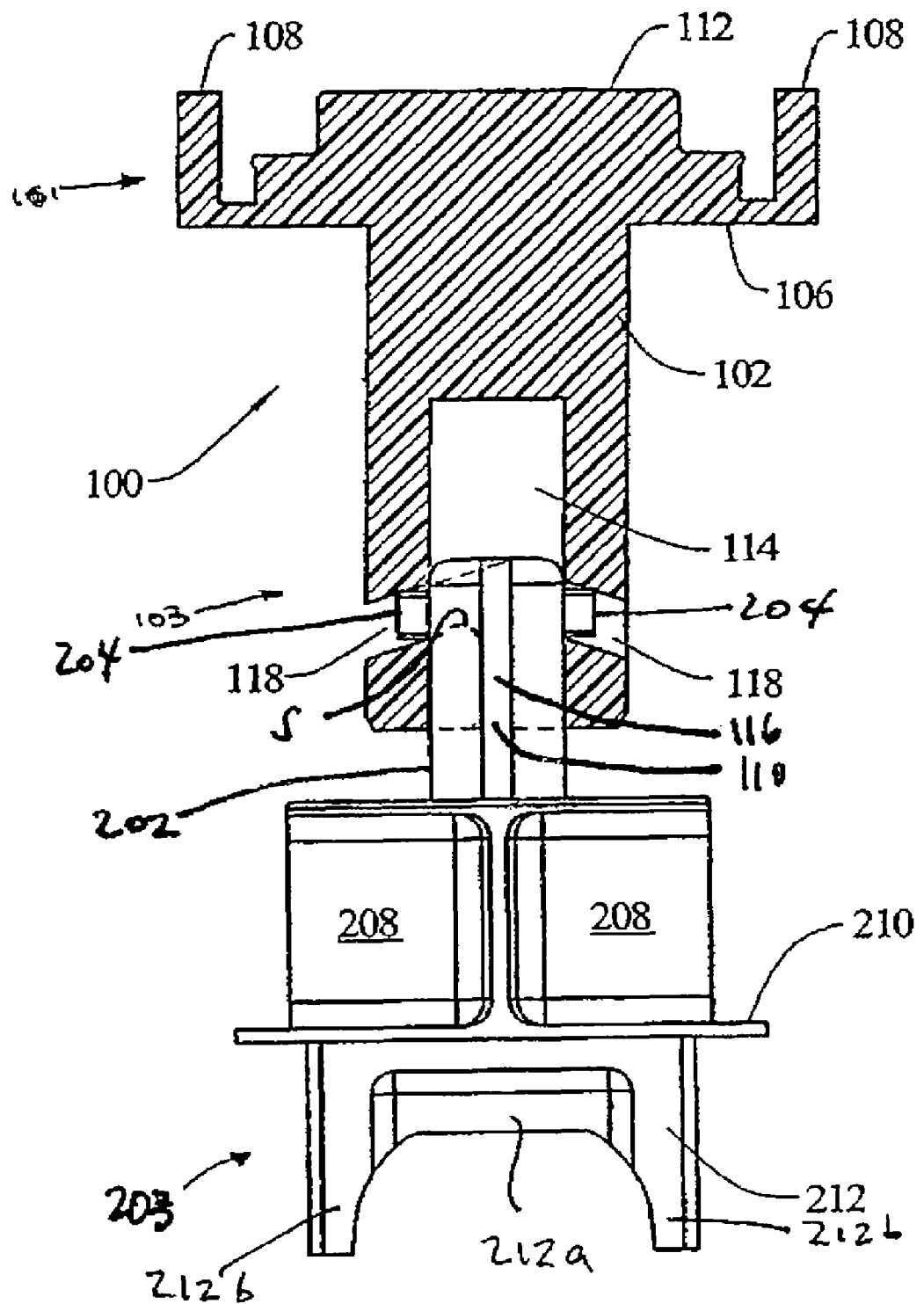

Inboard end 103 of outboard element 100 and the outboard end 201 of outboard element 200 may engage each other and reversibly lock together outboard and inboard elements 100, 200 within axial bore 10. Referring now to FIGS. 11a-c, the engagement of the elements 100, 200 is described. FIG. 11a shows the relative disposition of elements 100, 200 when inserted into axial bore 10, such that flanges 106 and 210 rest on inboard and outboard bearings 13, 14. Post 202 of element 200 is inserted into opening 114 of element 100, with nub 204 inserted into axial portion 116 of slot 110. Nub 204 cannot travel the entire length of axial portion 116, but is partially blocked from entering spiral portion 118 of slot 110 by shoulder S. Thus, shoulder S provides an initial resistance to engagement of nub 204 in spiral portion 118 and locking of elements 100, 200 together within axial bore 10.

Elements 100, 200 may be composed of a somewhat resilient material, such as plastic. As shown in FIG. 11b, when force is applied to compress elements 100, 200 together, nub 204 travels further into axial portion 116 of slot 110 until nub 204 moves past shoulder S. Nub 204 may then enter spiral portion 118 by rotating element 200 clockwise relative to element 100. Once nub 204 is positioned in spiral portion 118, post 202 cannot be withdrawn from opening 114, thereby locking elements 100, 200 together within axial bore 10. As shown in FIG. 11c, when nub 204 is moved to the end E (FIG. 6) of spiral portion 118, element 200 has rotated 90° relative to element 100.

Once nub 204 moves past shoulder S, the compression of elements 100, 200 can be relaxed. As best seen in FIGS. 2 and 11a-11c, spiral portion 118 of slot 110 curls back toward axial portion 116 in an inboard direction, such that elements 100, 200 move slightly apart as nub 204 travels to the end of spiral portion 118. As shown in FIGS. 11a-c, the spiral configuration of portion 118 appears angled relative to axial portion 116 when seen in side section view. Thus, shoulder S provides an initial resistance to engagement of nub 204 in spiral portion 118, which is relieved once nub 204 moves past shoulder S. This initial resistance provides for positive engagement of elements 100, 200, confirming that elements 100, 200 are locked together within axial bore 10.

In a preferred embodiment, elements 100, 200 maintain a slight compression when nub 204 has reached the end of spiral portion 118, to ensure that flanges 106 and 210 press against bearings 13, 14 and secure the bearings within axial bore 10 and seal the bore from contaminants. To unlock elements 100, 200 and disassemble the shipping retainer, the user must, once again, apply an initial compression to overcome the resistance to movement of nub 204 past shoulder S, as element 200 is rotated counterclockwise relative to element 100. Once nub 204 travels past shoulder S and enters axial portion 116, compression of elements 100, 200 is relieved and post 202 may be withdrawn from opening 114. The need for compression when unlocking elements 100, 200 reduces the likelihood of inadvertent disassembly of the shipping retainer.

Shoulder S is rounded to facilitate movement of nub 204 past shoulder S. The resilient material in combination with the rounded profile of shoulder S allows the shipping retainer to be assembled or disassembled simply by rotating elements 100, 200 relative to each other. Rotation forces nub 204 to travel the curve of shoulder S, causing the compression of elements 100, 200 and forcing shoulder S to flex out of the way of nub 204. Once nub 204 enters spiral portion 118, elements 100, 200 relax and shoulder S resumes its original configuration. The elastic flexing of shoulder S allows shoulder S to serve as a detent mechanism, which provides an initial resistance to locking of elements 100, 200 as it moves out of the way of nub 204 and then resumes its configuration after nub 204 moves past shoulder S.

To facilitate locking of outboard and inboard elements 100, 200, one of elements 100, 200 may be held in a generally fixed position while rotating the other element. As best shown in FIGS. 2, 7, 9 and 10, inboard end 203 of the inboard element 200 includes a shaped projection 212 that extends inboardly from the inboard end 203, and particularly from the inboard side of inboard radial flange 210. Projection 212 includes a substantially planar web 212a extending between horns 212b, that obviate the need for tools to engage and disengage the elements 100 and 200. As discussed in detail below, a shipping tray 300 is configured to receive web 212a and horns 212b within a channel 326a and recesses 327 to inhibit rotation of the inboard element 200, thereby facilitating engagement of outboard and inboard elements 100, 200. Projection 212 may have an alternative geometry such as a hexagon or other suitable shape, so long as the projection 212 mates or cooperates with tray 300 to prevent rotation of inboard element 200.

As shown generally in FIGS. 12-15, tray 300 is formed from a sheet of molded plastic or similar material, and has a first side 310 and a second side 330. Second side 330 has a profile that is generally the positive or opposite of the profile of first side 310, to permit nested stacking of trays 300. As described in detail below, first and second sides 310, 330 are respectively adapted to receive the inboard and outboard ends 11, 12 of a wheel hub having a shipping retainer installed therein. Wheel hubs are packaged for transport by sandwiching them between the first and second sides 310, 330 of a pair of trays 300. The trays 300 are then secured together by strapping or other conventional means. It will be apparent to those of skill in the art that multiple layers of wheel hubs can be packaged by alternating each layer with a tray 300. Once the wheel hubs are sandwiched between two trays 300, the wheel hub pilot surfaces and other features are protected from dents, scrapes and other damage that can cause misalignment between the wheel hub and other wheel components, such as a brake drum.

First side 310 is provided with a plurality of wells 320, that are sized and shaped to receive a plurality of hubs therein. As best shown in FIG. 12, the exemplary illustrated tray 300 includes nine wells 320. In a preferred embodiment, tray 300 is approximately 42" square so that tray 300 may be supported on a conventional shipping pallet. Wells 320 have a stepped configuration that corresponds to the shape of a wheel hub, particularly the shape of the inboard portion of the hub. As shown in FIGS. 12 and 14, wells 320 include a sill 322 and a floor 324. Sill 322 is sized and shaped to support the hub's bolting flange 16, and floor 324 supports inboard end 11 of the hub. Further, the floor 324 includes a pair of opposed C-shaped wrenching members 326 and recesses 327.

As previously described, shipping retainer inboard element 200 is provided with a projection 212 that is adapted to mate with first side 310 of tray 300. As best shown in FIG. 14, opposed wrenching members 326 form a channel 326a between them, that is sized and shaped to receive web 212a of projection 212. In addition, recesses 327 may receive horns 212b of projection 212. When a wheel hub having a shipping retainer installed is seated in well 320, channel 326a and recesses 327 mate with projection 212 to prevent the rotation of inboard element 200 relative to the shipping tray. Thus, tray 300 serves as a wrench to hold element 200 in place while outboard element 100 is inserted into the hub's bore and rotated or twisted to lock or unlock elements 100, 200 and assemble or disassemble the shipping retainer.

Once a plurality of hubs are disposed within the plurality of recesses 320 of the tray 300 and the hub bearings are secured with elements 100, 200, the second side 330 of another tray 300 may be disposed on top of the hubs and lower tray 300 to enclose and protect the wheel hubs. As shown in shown in FIGS. 14 and 15, second side 330 is provided with a series of shelves 332, each having wall 334 and an opening 328. As best shown in FIG. 15, shelves 332 are positioned such that when second side 330 is placed on top of the wheel hubs, each shelf 332 rests on outboard end 12 of the hub and wheel hub bolts 17 project through openings 328. In addition, walls 334 extend beyond outboard end 12 of the wheel hub to prevent lateral movement of the hub relative to second side 330. It will be apparent to those of skill in the art that, when wheel hub bolts 17 are inserted into openings 328, the wheel hub is prevented from rotating within wells 320 and inadvertently disengaging the shipping retainer. In this way, the upper and lower trays 300 cooperate to secure the hub for shipping or transport such that the shipping retainer, which comprises the elements 100, 200, does not become accidentally disengaged from the hub.

As indicated above, shipping tray 300 is used to facilitate unlocking of elements 100, 200 and disassembly of the shipping retainer prior to installation of the wheel hub on an axle. As described above, inboard and outboard elements 100, 200 may be unlocked by rotating outboard element 100 using handle 112, while inboard element 200 is held in place by shipping tray 300. More advantageously, elements 100, 200 may be unlocked by gripping and rotating the wheel hub using the various wheel hub bolts as handles. Contact between the surface area of wings 108 and the inner circumference of axial bore 10 causes outboard element 100 to be frictionally coupled to the wheel hub, such that rotation of the wheel hub effectively rotates outboard element 100. Thus, the rotation of the wheel hub unlocks elements 100, 200 and disassembles the shipping retainer.

Shipping tray 300 does not require a different tray design to accommodate the asymmetric configuration of inboard and outboard ends 11, 12 of a wheel hub. Thus, the cost of manufacturing and storing multiple different shipping tray designs is eliminated. Moreover, several shipping trays 300 may be stacked vertically, thereby facilitating the safe transport and handling of many hubs simultaneously within the same area. For example, a plurality of wheel hubs may be handled or shipped by placing the trays on a pallet and lifting with a forklift or the like. Additionally, the vertical stacking of several trays 300 is especially advantageous for storage logistics. When stacked, the trays 300 may sandwich and protect many hubs in a compact area for efficient use of floorspace, such as in a garage or warehouse.

One exemplary method of employing the packaging system is hereafter described. A first shipping tray 300 is provided and is oriented to access its first side 310. Shipping retainer inboard element 200 is positioned within a well 320 of first tray 300, such that projection 212 is received in channel 326a and recesses 327 formed in first side 310 of tray 300. The inboard end 11 of a wheel hub is seated in well 320, with inboard element 200 inserted into axial bore 10 of the wheel hub. Shipping retainer outboard element 100 is inserted into the outboard end axial bore 10, such that post 202 of element 200 is inserted into opening 114 of element 100, with nub 204 inserted into axial portion 116 of slot 110. Outboard element 100 is then rotated clockwise 90° using handle element 112, to lock inboard and outboard elements 100, 200 together within axial bore 10 of the wheel hub and assemble the shipping retainer. Channel 326a and recesses 327 of tray 300 facilitate assembly of the shipping retainer by preventing the rotation of inboard element 200, as described above. Additional hubs may be inserted into the first tray 300 as desired in accordance with the foregoing.

A second tray 300 is positioned over first tray 300 and the wheel hubs disposed therein. Second tray 300 has the same orientation as first tray 300, such that outboard end 12 of the wheel hub rests on shelves 332 formed on second side 330 and is contained by walls 334, and wheel hub bolts 17 project through openings 328, as described above. An additional layer of wheel hubs may be seated in wells 320 of second tray 320, and the packaging process repeated. Packaging is completed by securing the shipping trays together using strapping or other conventional means.

To disengage the wheel hub from the packaging system so the hub may be installed on a vehicle axle, the second tray 300 is removed. A counterclockwise rotational force is applied to shipping retainer outboard element 100 to unlock elements 100, 200 and disassemble the shipping retainer. Alternatively, the counterclockwise rotational force may be directly applied to the wheel hub for additional leverage, as described above. The wheel hub is then removed from the first tray such that the inboard element 200 disengages the hub and remains in the tray 300. Outboard element 100 remains within the wheel hub axial bore 10 to maintain the alignment of outboard bearing 14 and spacer 15, thereby facilitating installation of the hub onto an axle. Outboard element is displaced from axial bore 10 as the wheel hub is installed on the axle.

Figure 16:
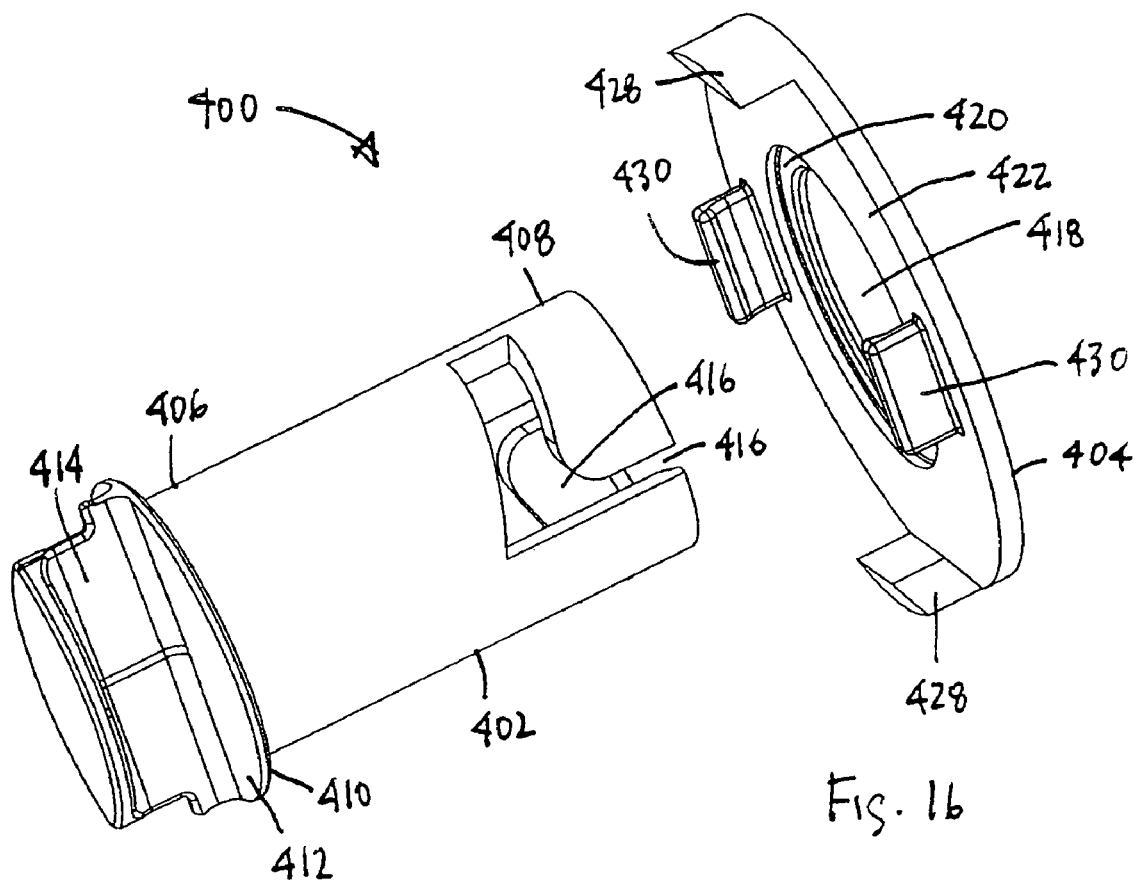
FIG. 16 is a perspective view of an alternative embodiment of the shipping retainer outboard element having a separately formed main body and radial flange.
Figure 17:
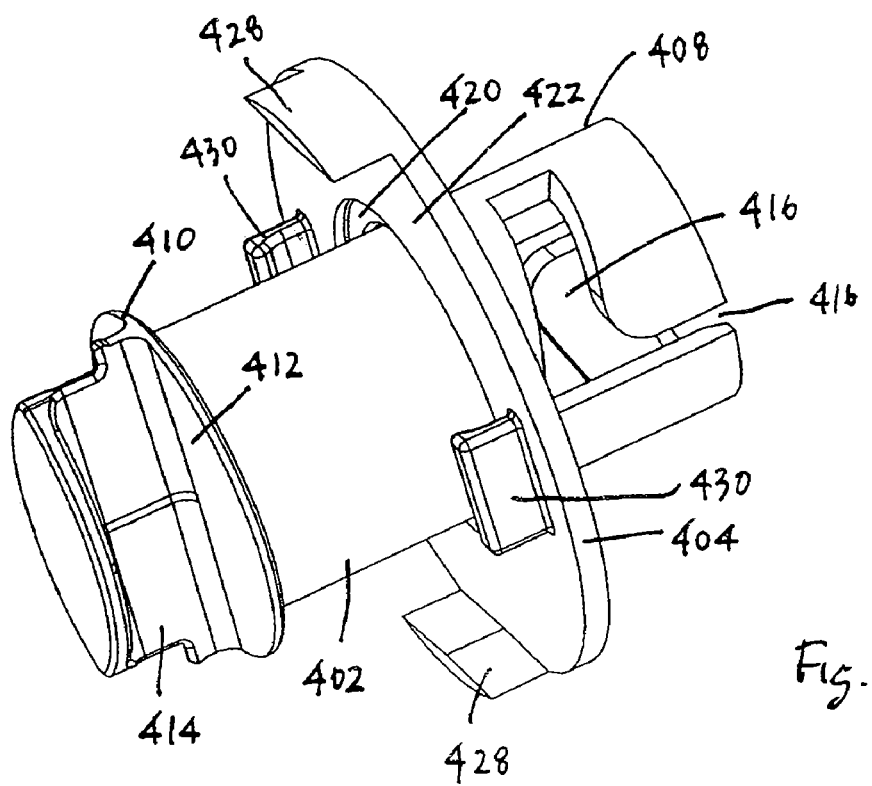
FIG. 17 is a perspective view of the shipping retainer outboard element of FIG. 16, with the main body and radial flange partly assembled.

In an alternative embodiment shown in FIGS. 16-17, the shipping retainer has a two-part outboard element 400 comprising a main body 402 and a separately formed radial flange 404. As best shown in FIG. 16, main body 402 is a hollow cylinder with outboard and inboard ends 406, 408. Outboard end 406 has a lip 410 and an outboard surface 412. A handle 414 extends from outboard surface 412. A pair of opposed L-shaped slots 416 are formed at inboard end 408 of main body 402. Radial flange 404 is disk-shaped and has an opening 418 that is sized and shaped to receive main body 402. A shoulder 420 is formed in the outboard surface 422, around the periphery of opening 418. Shoulder 420 is sized and shaped to receive lip 410 of main body 402. As shown in FIG. 17, outboard element 400 is assembled by inserting main body 402 into opening 418 of radial flange 404, until lip 410 rests on shoulder 420. In a preferred embodiment, when outboard element 400 is assembled, outboard surface 412 of main body 402 is flush with outboard surface 422 of radial flange 404.

Figure 18:
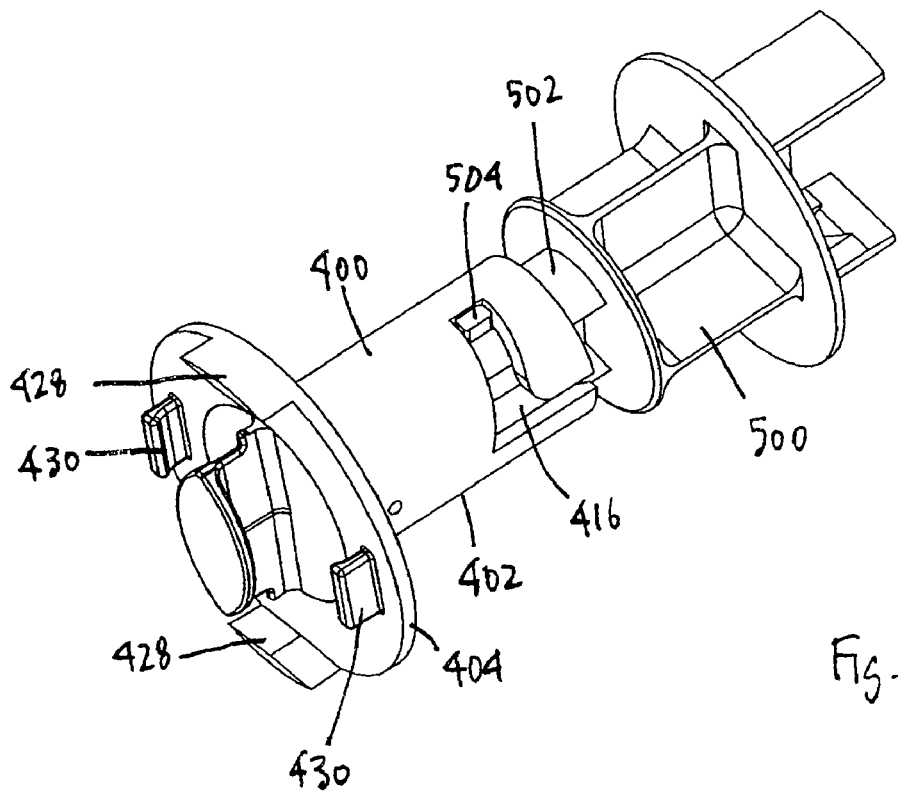
FIG. 18 is a perspective view of an assembled shipping retainer including the shipping retainer outboard element of FIG. 16.
Figure 19:
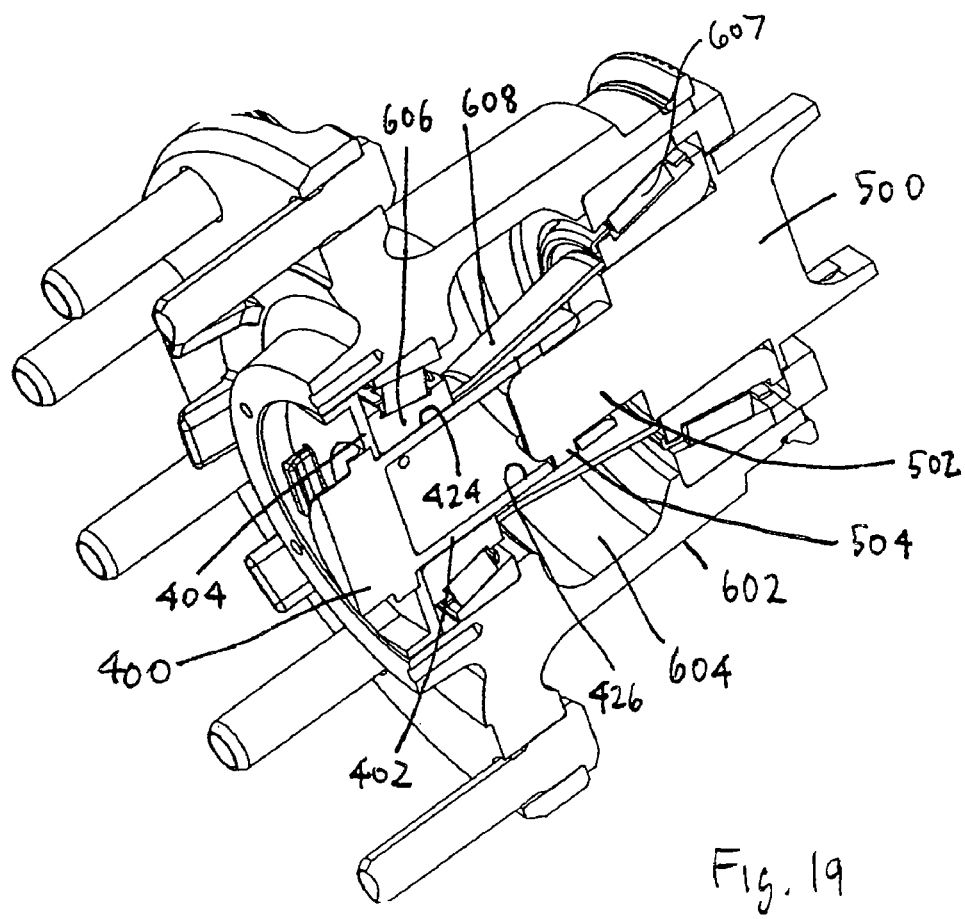
FIG. 19 is a section view of the shipping retainer of FIG. 18 assembled within a wheel hub.

As shown in FIGS. 18 and 19, outboard element 400 engages an inboard element 500 within the axial bore 604 of a wheel hub 602, in a similar manner as described above. The outer circumference 424 of main body 402 is sized and shaped to contact the inner circumference of the outboard bearing 606 and spacer 608 to maintain their relative alignment within the axial bore 604 of wheel hub 602. Radial flange 404 rests on outboard bearing 606 to retain the outboard bearing in place within wheel hub 602. Inboard element 500 has a post 502 that is sized and shaped to fit within the inner circumference 426 of main body 402. Nubs 504 of post 502 engage L-shaped slots 416 on outboard element 400 to reversibly lock together outboard and inboard elements 400, 500 within the axial bore 604 of wheel hub 602, as described above.

Figure 20A:
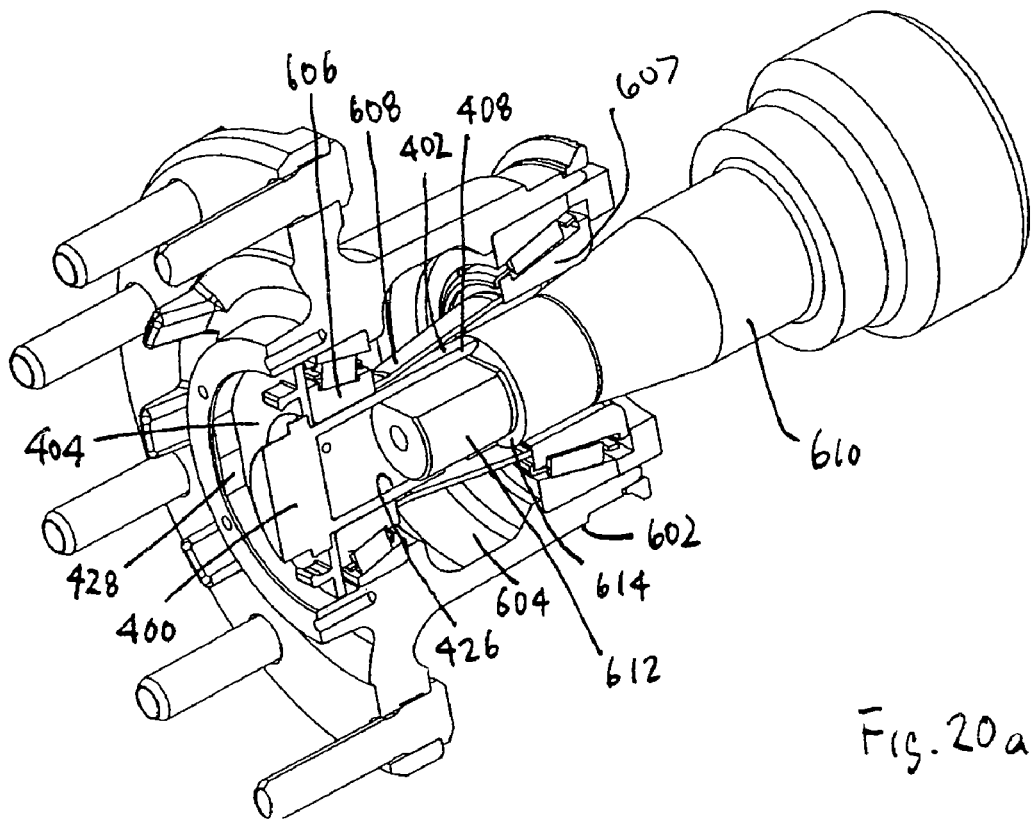
FIGS. 20a-20d are partial section views illustrating the operation of the shipping retainer outboard element of FIG. 16 during installation of the wheel hub on an axle.

Separately formed radial flange 404 prevents the outboard bearing of the wheel hub from becoming dislodged as the wheel hub is installed on the axle and prevents contamination of interior hub surfaces, interior components, the outer bearing assembly, the bearing spacer, the inner bearing assembly and the seal. Radial flange 404 also is an assembly aid when installing the wheel hub on the axle in combination with the outboard element 400. FIGS. 20a-20d illustrate how outboard element 400 facilitates the installation of wheel hub 602 on an axle 610. FIG. 20a shows the wheel hub 602 with outboard element 400 inserted into axial bore 604. Inboard element 500 has been removed and wheel hub 602 has been mounted over the end 612 of axle 610. End 612 of axle 610 is roughly cylindrical and has a shoulder 614. The inner circumference 426 of outboard element main body 402 is sized and shaped to receive end 612 of axle 610, such that inboard end 408 rests on shoulder 614.

Figure 20B:
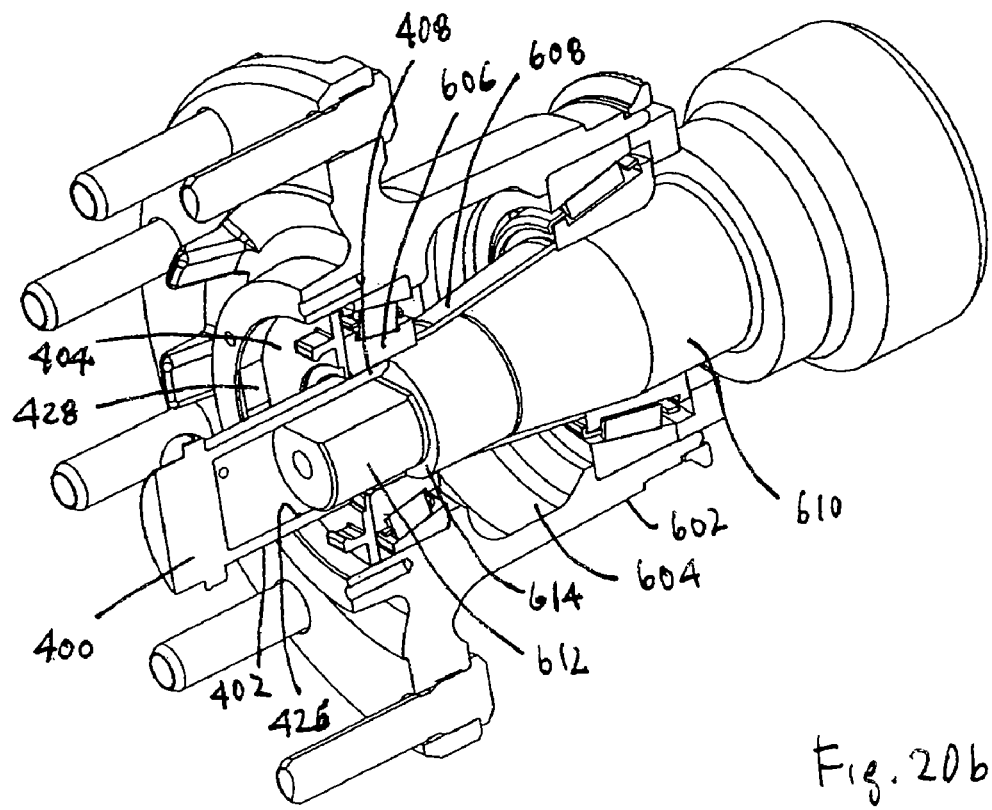

As wheel hub 602 is mounted on axle 610, the axle displaces outboard element main body 402 from axial bore 604 without disturbing radial flange 404, as shown in FIG. 20b. Outboard element main body 402 maintains the alignment between outboard bearing 606 and spacer 608 of wheel hub 602 as axle 610 is inserted into axial bore 604, to prevent the axle from binding and causing damage to the outboard bearing or axle and to reduce the effort required to install the wheel hub on the axle.

Figure 20C:
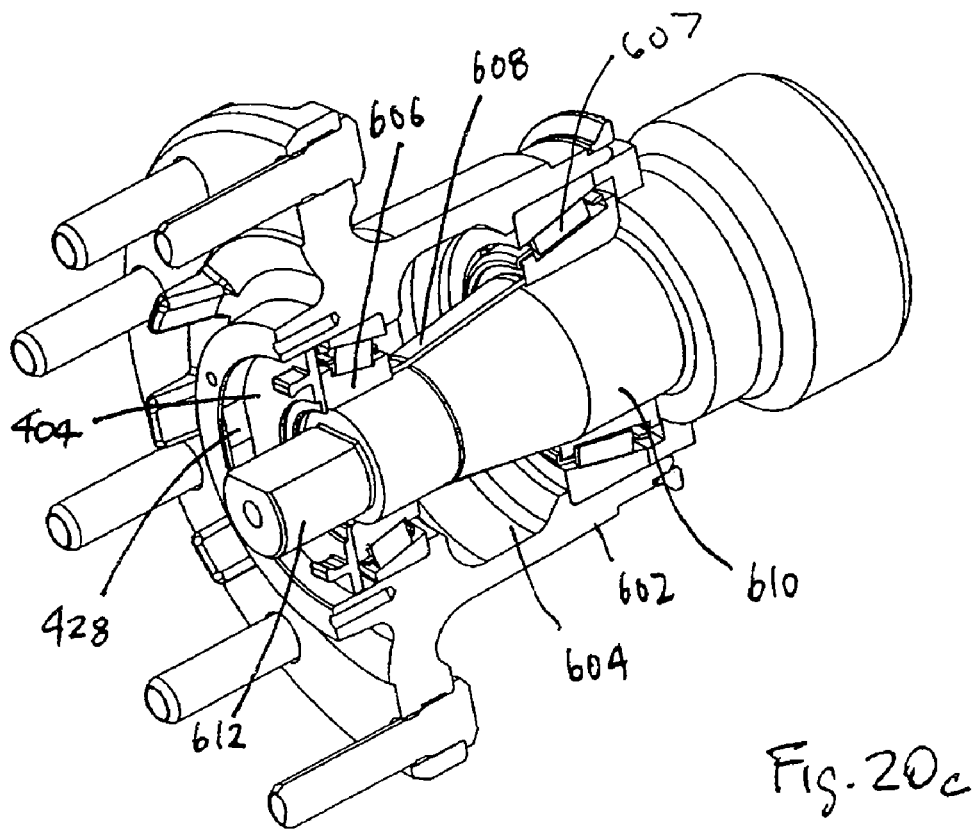
Figure 20D:
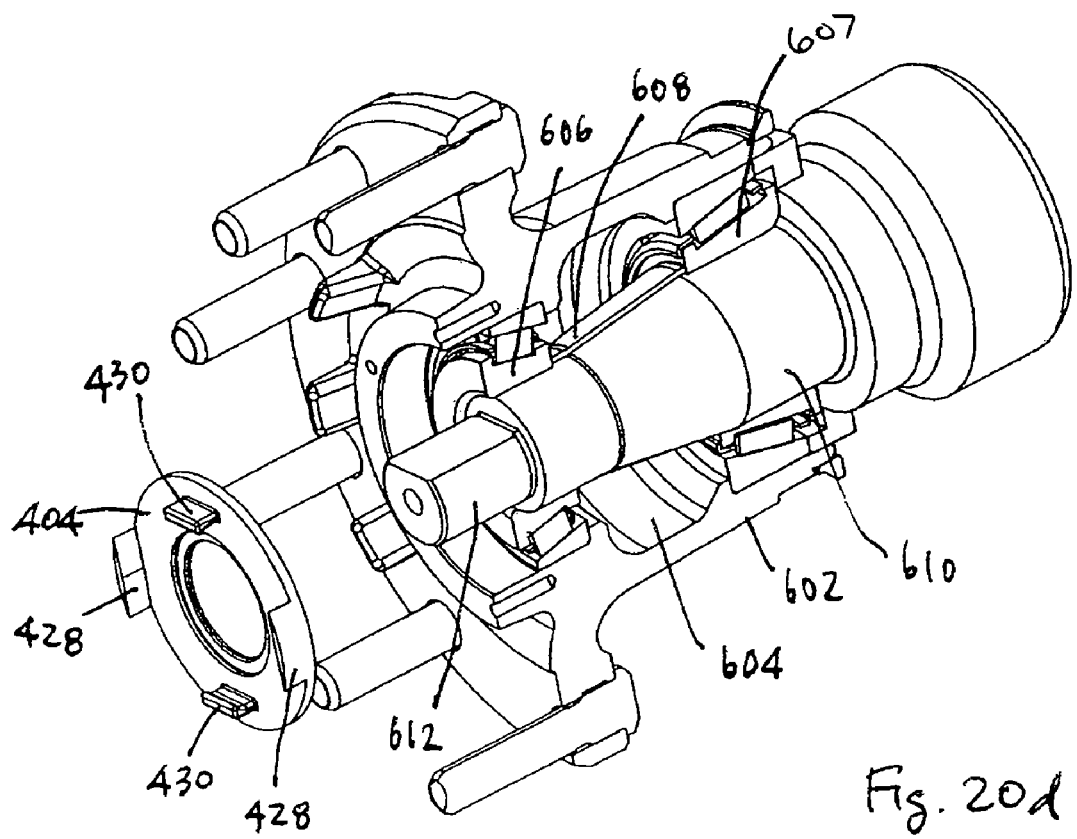
Figure 21:
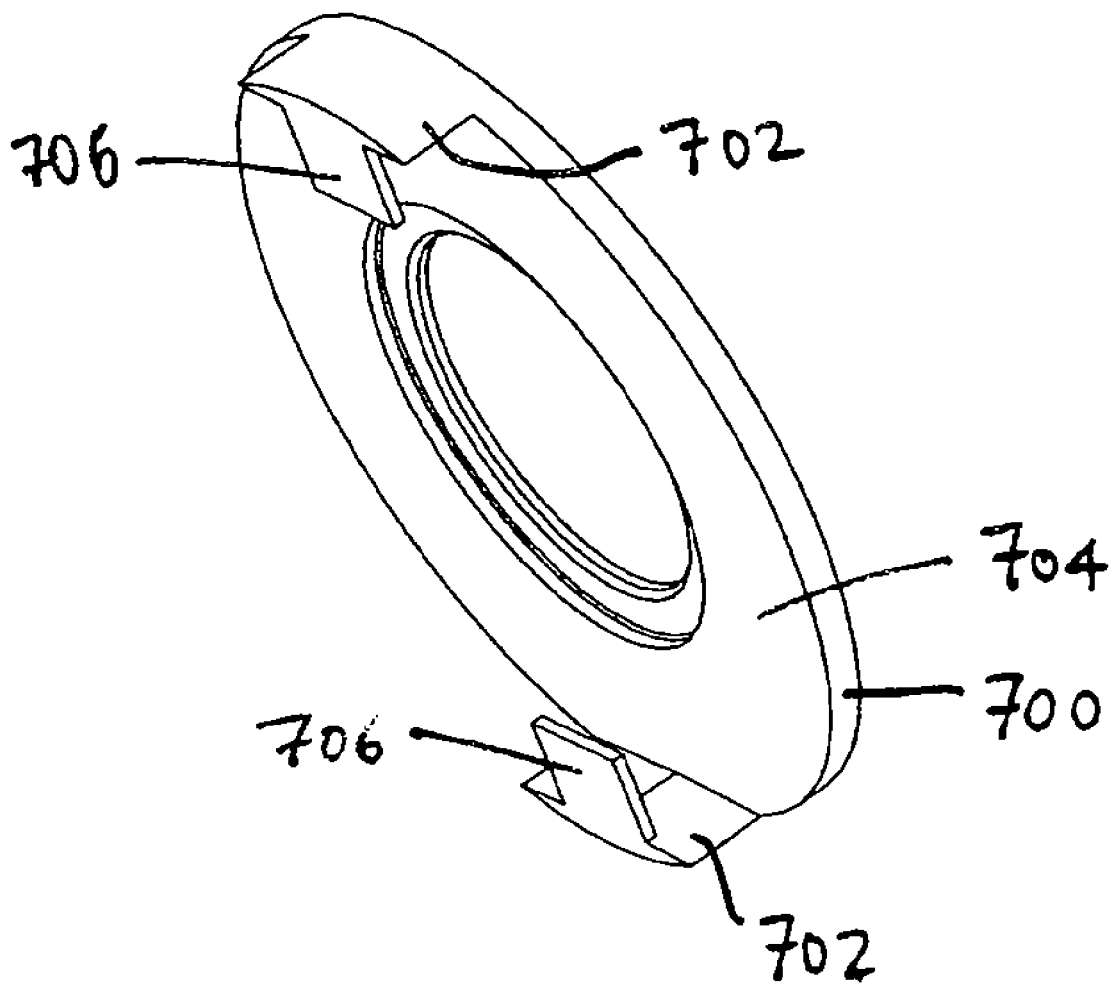
FIG. 21 is a perspective view of an alternative embodiment of a separately formed outboard element radial flange.

FIG. 20c shows axle 610 fully inserted into axial bore 604 of wheel hub 602, with main body 402 of outboard element 400 completely displaced from the axial bore. Radial flange 404 remains mounted in wheel hub 602 during installation on axle 610 to retain outboard bearing 606 in the wheel hub and prevent the bearing from becoming dislodged by the axle. Wings 428 extend from outboard surface 422 of radial flange 404 to stabilize the radial flange within wheel hub 602, in the same manner as described above. As shown in FIG. 20d, once axle 610 is fully inserted into axial bore 604, then radial flange 404 may be removed from wheel hub 602. Tabs 430 are formed on outboard surface 422 of radial flange 404 to provide grips for and thereby assist in removing the radial flange from wheel hub 602. FIG. 21 shows an alternative embodiment of the radial flange 700, with wings 702 extending from the outboard surface 704. Tabs 706 extend from wings 702 to provide grips for removing the radial flange from the wheel hub.

Figure 22A:
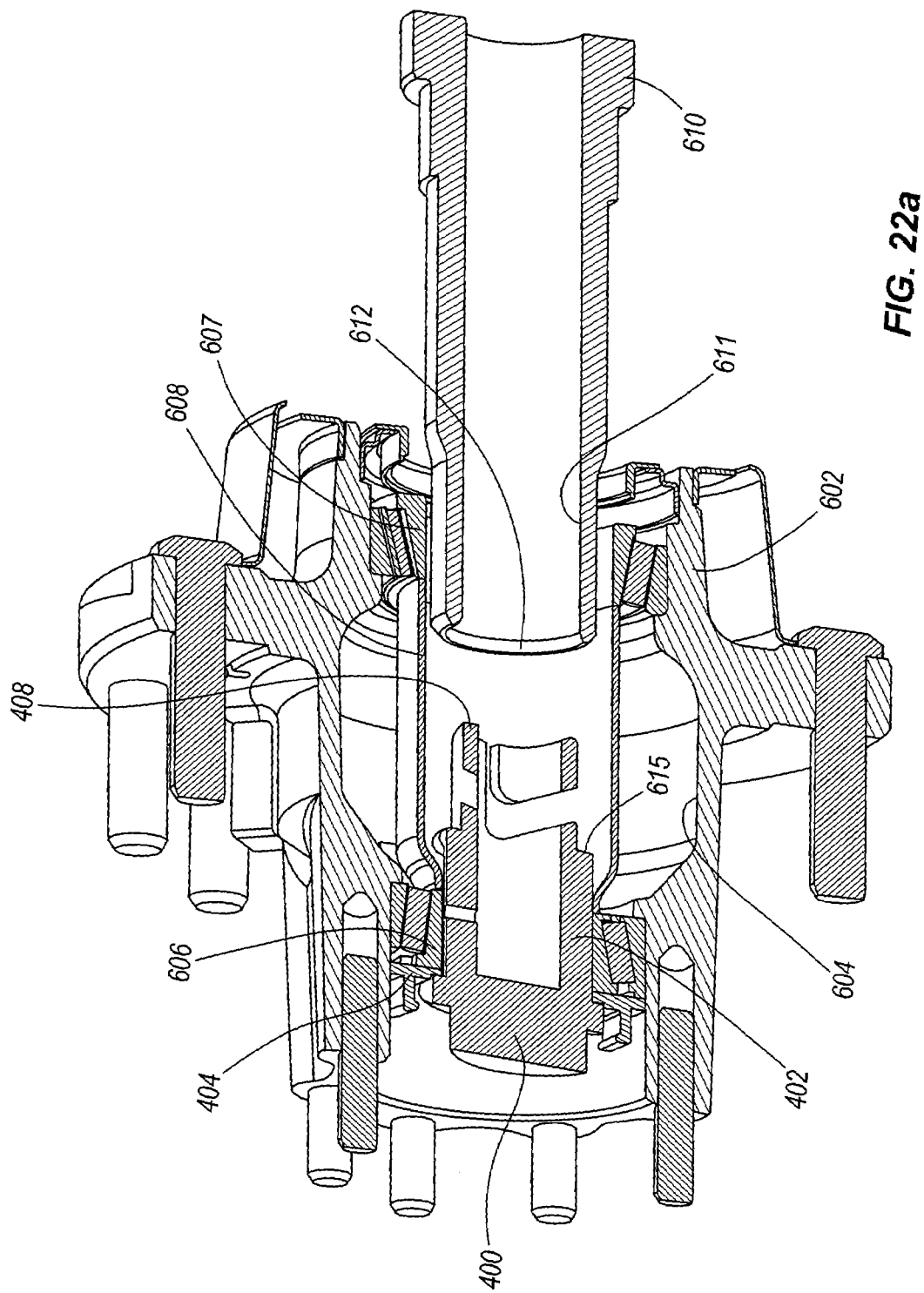
FIGS. 22a-22e are partial section views illustrating operation of an alternative shipping retainer outboard element having a separately formed main body and radial flange, similar to that shown in FIG. 16, during installation of the wheel hub on an axle, the axle having an axle tube and the shipping retainer outboard element being sized to fit within the axle tube during installation.
Figure 22B:
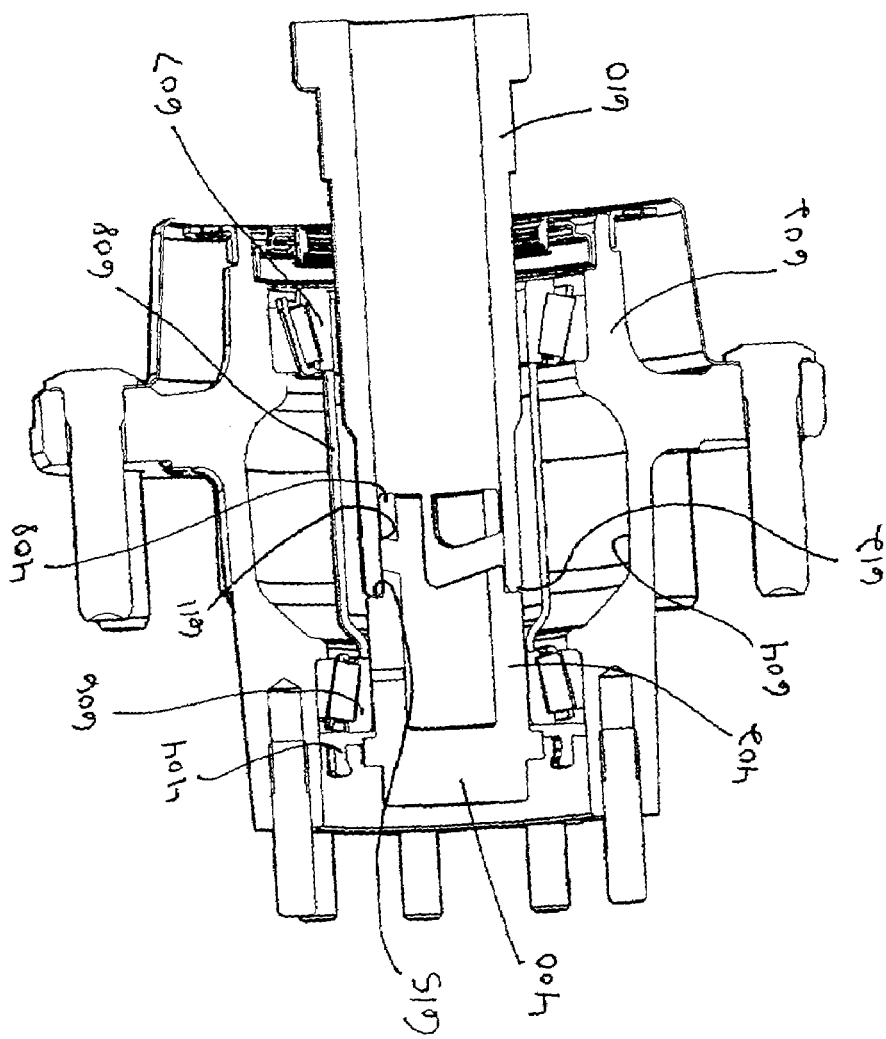

With reference to FIGS. 22a-e, an alternative embodiment of how outboard element 400 facilitates the installation of wheel hub 602 on an axle 610 is shown. In this embodiment, the axle 610 has an axle tube 611 and the main body 402 is sized and shaped to fit within the axle tube 611 to act as a guide during the installation of the hub 602 on the axle 610. This manner of engagement maintains the alignment of the wheel hub bearings 606, 607 and spacer 608 relative to the axle 610. FIG. 22a shows the wheel hub 602 with outboard element 400 inserted into axial bore 604. Inboard element 500 has been removed and wheel hub 602 has been mounted over the end 612 of axle 610. With reference to FIG. 22b, The axle tube 611 of the axle 610 is cylindrical and is sized and shaped to receive the outboard element main body 402 therein. End 612 of axle 610 engages shoulder 615 of the outboard element main body 402.

Figure 22C:
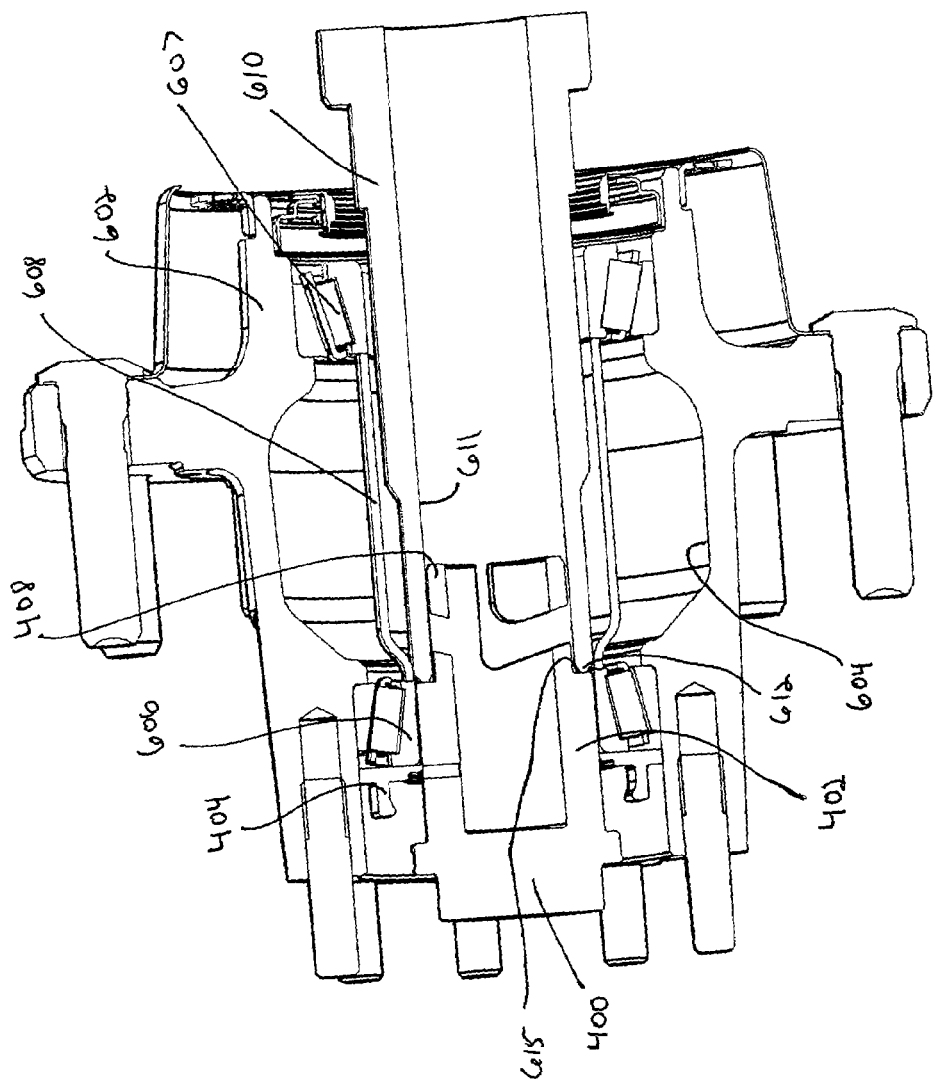
Figure 22D:
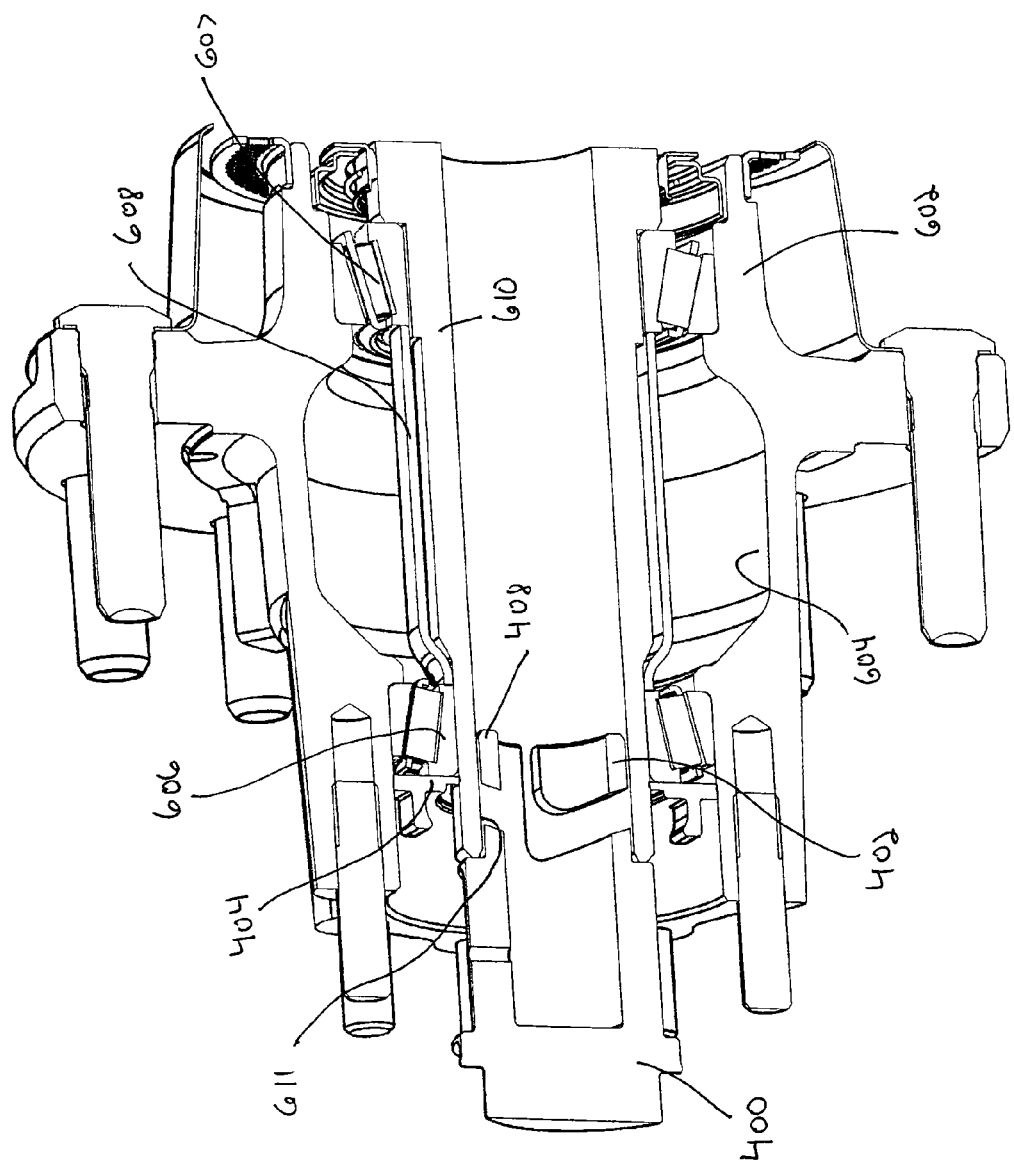

Referring to FIGS. 22c and 22d, as the wheel hub 602 is mounted on the axle 610, the axle 610 displaces outboard element main body 402 from axial bore 604 without disturbing radial flange 404. Outboard element main body 402 maintains the alignment between outboard bearing 606 and spacer 608 of wheel hub 602 as axle 610 receives the main body 402 and engages shoulder 615. In this manner, the axle 610 is prevented from binding and causing damage to the outboard bearing 606 or axle 610 and the effort required to install the wheel hub 602 on the axle 610 is reduced.

Figure 22E:
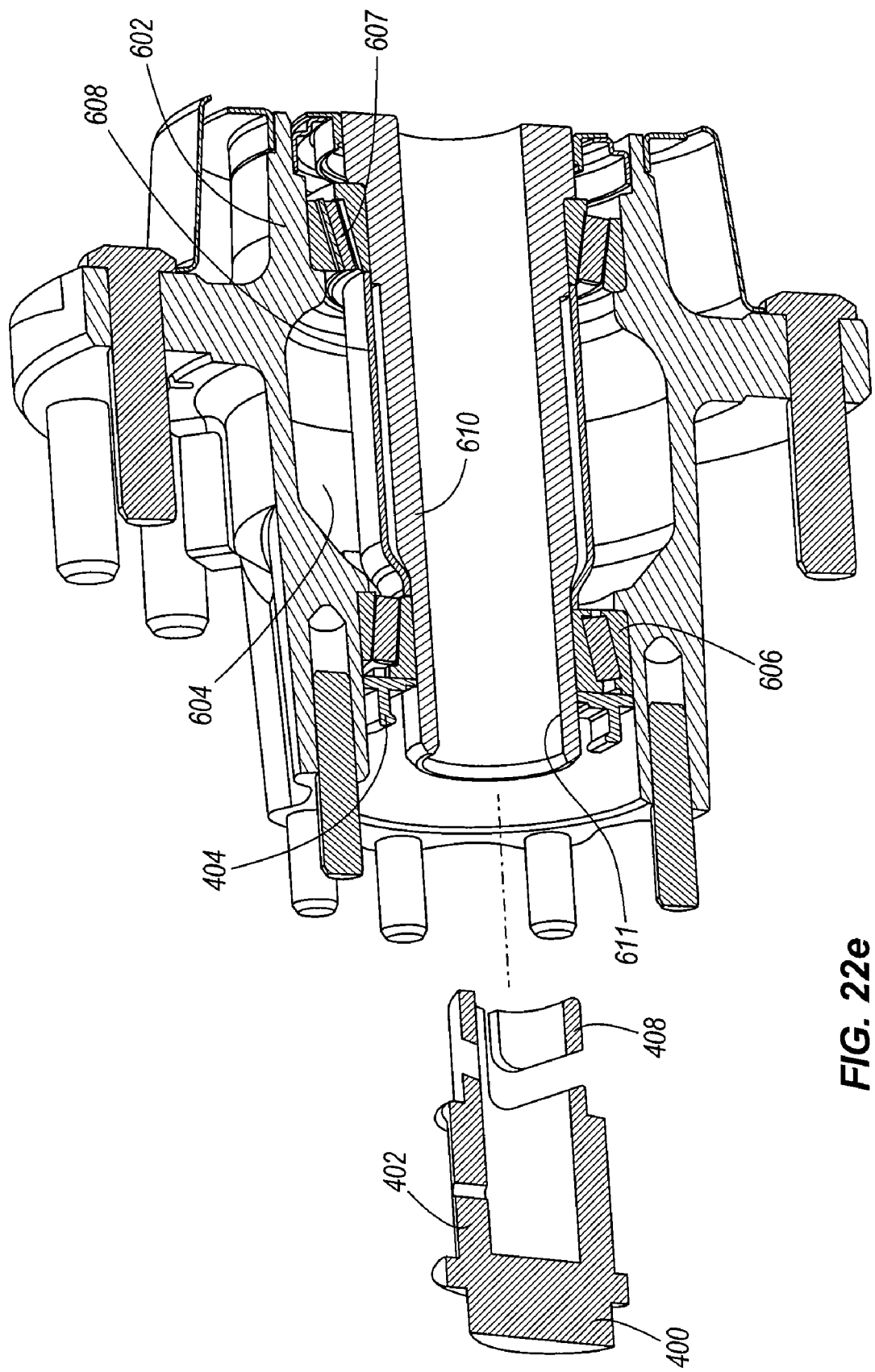

FIG. 22e shows axle 610 fully inserted into axial bore 604 of wheel hub 602, with main body 402 of outboard element 400 completely displaced from the axial bore 604. Radial flange 404 remains mounted in wheel hub 602 during installation on axle 610 to retain outboard bearing 606 in the wheel hub 602 and prevent the bearing 606 from becoming dislodged by the axle 610. Radial flange 404 can then be removed after the axle 610 is completely inserted into the axial bore 604 of the wheel hub 602.

The use of any and all examples, or exemplary language (e.g., "such as") provided herein, is intended merely to better illuminate the invention and does not constitute a limitation on the scope of the invention. Preferred embodiments of this invention are described herein. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A packaging system for a wheel hub, said wheel hub having an inboard end, an outboard end and an axial bore, said axial bore containing an inboard bearing positioned at said inboard end of said wheel hub, an outboard bearing positioned at said outboard end of said wheel hub, and a spacer positioned between said inboard and outboard bearings, said inboard and outboard bearings and said spacer each having an opening for receiving an axle, said packaging system comprising:

an inboard element having a first body and a first radial flange, said first radial flange sized and shaped to fit within said axial bore at said inboard end of said wheel hub;

an outboard element having a second body and a second radial flange, said second radial flange sized and shaped to fit within said axial bore at said outboard end of said wheel hub;

a locking member on one of said inboard and outboard elements, and a receiving member on the other of said inboard and outboard elements, said locking member engageable with said receiving member to lock said inboard and outboard elements together within said axial bore; and a tray sized and shaped to receive said wheel hub when said inboard and outboard elements are positioned within said axial bore, wherein said tray has first and second sides, said first side sized and shaped to receive said inboard end of said wheel hub and said second side sized and shaped to receive said outboard end of said wheel hub.

2. The packaging system of claim 1, wherein said first radial flange rests on said inboard bearing and said second radial flange rests on said outboard bearing when said packaging system is within said wheel hub.

3. The packaging system of claim 1, wherein said first body of said inboard element is sized and shaped to fit within and align said openings of said inboard bearing and said spacer.

4. The packaging system of claim 1, wherein said second body of said outboard element is sized and shaped to fit within and align said openings of said outboard bearing and said spacer.

5. The packaging system of claim 1, wherein said locking member is engageable with said receiving member to lock said inboard and outboard elements together and the locking member is disengageable from said receiving member to unlock said inboard and outboard elements.

6. The packaging system of claim 1, wherein said locking member is engageable with said receiving member to reversibly lock said inboard and outboard elements together within said axial bore.

7. The packaging system of claim 6, wherein said locking member has a post with a nub disposed thereon, said receiving member has a wall defining an opening that is sized and shaped to receive said post, and said wall having a slot sized and shaped to receive said nub, wherein said nub engages said slot to reversibly lock said inboard and outboard elements together.

8. The packaging system of claim 7, wherein said wall of said receiving member is cylindrical and said slot has an axial portion and a spiral portion, said spiral portion beginning at one end of said axial portion and curling back toward said axial portion.

9. The packaging system of claim 8, wherein said slot has an initial resistance to movement of said nub between said axial portion and said spiral portion.

10. The packaging system of claim 1, wherein said locking member and said receiving member have an initial resistance to engagement.

11. The packaging system of claim 1, wherein said locking member and said receiving member form a detent locking mechanism.

12. The packaging system of claim 1, wherein said second body and said second radial flange are separately formed.

13. The packaging system of claim 1, wherein said axle has an axle tube, and said second body is sized and shaped to fit within said axle tube.

14. The packaging system of claim 1, wherein said locking member is engageable with said receiving member by rotation of said locking member relative to the receiving member.

15. The packaging system of claim 1, further comprising:
a projection extending from said inboard element;
a recess provided in said tray, said recess sized and shaped to receive said projection and prevent the rotation of said inboard element relative to said tray and facilitate locking and unlocking of said inboard and outboard elements.

16. The packaging system of claim 1, wherein said first side of said tray has a profile that is the opposite of the profile of said second side of said tray.

17. A packaging system for a wheel hub, said wheel hub having an inboard end, an outboard end and an axial bore, said axial bore containing an inboard bearing positioned at said inboard end of said wheel hub, an outboard bearing positioned at said outboard end of said wheel hub, and a spacer positioned between said inboard and outboard bearings, said inboard and outboard bearings and said spacer each having an opening for receiving an axle, said packaging system comprising:
an inboard element having a first body and a first radial flange, said first radial flange sized and shaped to fit within said axial bore at said inboard end of said wheel hub, and said first body is sized and shaped to fit within and align said openings of said inboard bearing and said spacer;
an outboard element having a second body and a second radial flange, said second radial flange sized and shaped to fit within said axial bore at said outboard end of said wheel hub, and said second body is sized and shaped to fit within and align said openings of said outboard bearing and said spacer; and
a locking member on one of said inboard and outboard elements, and a receiving member on the other of said inboard and outboard elements, said locking member engageable with said receiving member to lock said inboard and outboard elements together within said axial bore, wherein said locking member has a post with a nub disposed thereon, said receiving member has a wall defining an opening that is sized and shaped to receive said post, and said wall having a slot sized and shaped to receive said nub, wherein said nub engages said slot to reversibly lock said inboard and outboard elements together, and wherein said wall of said receiving member is cylindrical and said slot has an axial portion and a spiral portion, said spiral portion beginning at one end of said axial portion and curling back toward said axial portion, and said slot has an initial resistance to movement of said nub between said axial portion and said spiral portion.

18. The packaging system of claim 17, wherein said locking member and said receiving member have an initial resistance to engagement.

19. The packaging system of claim 17, wherein said locking member engages said receiving member by rotation of said locking member relative to the receiving member.

20. The packaging system of claim 17, wherein said second body and said second radial flange are separately formed.

21. The packaging system of claim 17, wherein said locking member is engageable with said receiving member to reversibly lock said inboard and outboard elements together within said axial bore.

22. The packaging system of claim 17, wherein said axle is a drive axle with an axle tube, and said second body is sized and shaped to fit within said axle tube.

23. The packaging system of claim 17, further comprising a tray sized and shaped to receive said wheel hub when said inboard and outboard elements are positioned within said axial bore.

24. The packaging system of claim 23, further comprising:
a projection extending from said inboard element;
a recess provided in said tray, said recess sized and shaped to receive said projection and prevent the rotation of said inboard element relative to said tray and facilitate locking and unlocking of said inboard and outboard elements.

25. The packaging system of claim 23, wherein said tray has first and second sides, said first side sized and shaped to receive said inboard end of said wheel hub and said second side sized and shaped to receive said outboard end of said wheel hub.

26. The packaging system of claim 25, wherein said first side of said tray has a profile that is the opposite of the profile of said second side of said tray.

27. A packaging system for a wheel hub, said wheel hub having an inboard end, an outboard end and an axial bore, said axial bore containing an inboard bearing positioned at said inboard end of said wheel hub, an outboard bearing positioned at said outboard end of said wheel hub, and a spacer positioned between said inboard and outboard bearings, said packaging system comprising:

an inboard element having a first radial flange and a locking member, said first radial flange sized and shaped to fit within said axial bore at said inboard end of said wheel hub;

a projection extending from said first radial flange;

an outboard element having a second radial flange and a receiving member, said second radial flange sized and shaped to fit within said axial bore at said outboard end of said wheel hub;

a tray sized and shaped to receive said inboard end of said wheel hub;

a recess provided in said tray, said recess sized and shaped to receive said projection; and a locking member rotationally engageable with said receiving member to lock said inboard and outboard elements together within said axial bore, wherein rotation of said inboard element relative to said tray is prevented when said projection is received in said recess, to facilitate locking and unlocking of said inboard and outboard elements, and wherein said tray has first and second sides, said first side sized and shaped to receive said inboard end of said wheel hub and said second side sized and shaped to receive said outboard end of said wheel hub.

28. The packaging system of claim 27, wherein said outboard end of said wheel hub has at least one bolt projecting therefrom, said packaging system further comprising:

at least one well formed in said first side, said well sized and shaped to receive said inboard end of said wheel hub; and at least one opening formed in said second side, said opening positioned to allow said bolt to pass therethrough when said second side is placed on said outboard end of said wheel hub.

29. The packaging system of claim 27, wherein said first side of said tray has a profile that is approximately the opposite of the profile of said second side of said tray.

* * * * *